United States Patent
Namba et al.

(10) Patent No.: US 8,610,787 B2
(45) Date of Patent: Dec. 17, 2013

(54) CAMERA DEVICE INCLUDING PRIVACY PROTECTION METHOD

(75) Inventors: Takaaki Namba, Aichi (JP); Yusuke Mizuno, Aichi (JP)

(73) Assignee: Panasonic Corporation, Osaka (JP)

( * ) Notice: Subject to any disclaimer, the term of this patent is extended or adjusted under 35 U.S.C. 154(b) by 885 days.

(21) Appl. No.: 12/665,847

(22) PCT Filed: Jun. 20, 2008

(86) PCT No.: PCT/JP2008/001592
§ 371 (c)(1),
(2), (4) Date: Dec. 21, 2009

(87) PCT Pub. No.: WO2009/001530
PCT Pub. Date: Dec. 31, 2008

(65) Prior Publication Data
US 2010/0182447 A1    Jul. 22, 2010

(30) Foreign Application Priority Data

Jun. 22, 2007    (JP) ................................. 2007-164627

(51) Int. Cl.
*H04N 5/228*    (2006.01)
*H04N 9/47*    (2006.01)

(52) U.S. Cl.
USPC .... 348/222.1; 348/142; 348/169; 348/208.14

(58) Field of Classification Search
None
See application file for complete search history.

(56) References Cited

U.S. PATENT DOCUMENTS

| 6,067,399 | A  | * | 5/2000 | Berger | 386/280 |
| 7,423,667 | B2 | * | 9/2008 | Hayasaka | 348/143 |
| 7,847,820 | B2 | * | 12/2010 | Vallone et al. | 348/143 |
| 2002/0010859 | A1 | | 1/2002 | Maeda | |
| 2005/0018879 | A1 | * | 1/2005 | Ito et al. | 382/103 |
| 2005/0074140 | A1 | * | 4/2005 | Grasso et al. | 382/103 |
| 2005/0104956 | A1 | | 5/2005 | Ono et al. | |
| 2005/0152579 | A1 | * | 7/2005 | Park et al. | 382/103 |

(Continued)

FOREIGN PATENT DOCUMENTS

| EP | 1 388 802 A2 | 2/2004 |
| JP | 08-051611 A | 2/1996 |

(Continued)

OTHER PUBLICATIONS

International Search Report for PCT/JP2008/001592 dated Jul. 22, 2008.

(Continued)

*Primary Examiner* — Lin Ye
*Assistant Examiner* — John H Morehead, III
(74) *Attorney, Agent, or Firm* — RatnerPrestia

(57) ABSTRACT

Camera device includes an imaging unit, a communications unit, an identified area detection unit, and an image data processing unit. The imaging unit images an area in a shooting field to obtain image data. The communications unit communicates with a memory device that stores subject information, and obtains the subject information. The identified area detection unit dynamically detects an identified area corresponding to the subject. The image data processing unit specifies a protected area in the identified area based on the subject information, and applies protection only to the protected area when the subject is a protection target. This structure provides the camera device that generates image data in which a subject to be protected is obscured in an imaged subject.

30 Claims, 11 Drawing Sheets

(56) References Cited

U.S. PATENT DOCUMENTS

| | | | |
|---|---|---|---|
| 2005/0157908 A1* | 7/2005 | Matsugu et al. | 382/107 |
| 2006/0028558 A1* | 2/2006 | Sato et al. | 348/211.99 |
| 2006/0206911 A1 | 9/2006 | Kim et al. | |
| 2007/0071403 A1 | 3/2007 | Urita | |
| 2009/0074261 A1* | 3/2009 | Haupt et al. | 382/118 |
| 2009/0160939 A1* | 6/2009 | Fernandez et al. | 348/158 |
| 2012/0095982 A1* | 4/2012 | Lennington et al. | 707/706 |

FOREIGN PATENT DOCUMENTS

| | | |
|---|---|---|
| JP | 08-307877 A | 11/1996 |
| JP | 10-150548 A | 6/1998 |
| JP | 2002-076905 A | 3/2002 |
| JP | 2003-087632 A | 3/2003 |
| JP | 2005-130463 A | 5/2005 |
| JP | 2005-151124 A | 6/2005 |
| JP | 2005-223601 A | 8/2005 |
| JP | 2006-148386 A | 6/2006 |
| JP | 2006-217161 A | 8/2006 |
| JP | 2007-096864 A | 4/2007 |
| WO | WO 00/13411 A1 | 3/2000 |

OTHER PUBLICATIONS

Supplementary European Search Report for Application No. EP 08 76 4175, Dec. 27, 2010, Panasonic Corporation.

* cited by examiner

CAMERA DEVICE INCLUDING PRIVACY PROTECTION METHOD

THIS APPLICATION IS A U.S. NATIONAL PHASE APPLICATION OF PCT INTERNATIONAL APPLICATION PCT/JP2008/001592, FILED ON JUN. 20, 2008.

TECHNICAL FIELD

The present invention relates to a camera device and an imaging method of imaging a subject and recording image data of the subject that has been imaged to a recording medium.

BACKGROUND ART

Digital still cameras for photographing still images; camera devices, such as digital video cameras, for taking moving images; and a range of electronic devices, in which a digital camera is installed, are now in wide use. This has led to a growing risk that images taken unintentionally or by chance will include subjects protected under copyright, portrait rights, or other rights to privacy (hereinafter collectively called "protection targets"); or that taken images or their image data will spread. Moreover, a function for imaging and recording moving images for a short period is now also provided in most digital cameras and some camera phones. Furthermore, images captured by digital cameras and camera phones, including subjects that require protection, can also be distributed instantaneously worldwide via the Internet.

On the other hand, the faces of people are frequently captured by monitor cameras installed on streets and at ATM terminals, convenience stores, public facilities, companies, factories, and so on with the aim of protecting public amenities, ensuring security, and preventing crime. These pieces of image data, created based on images captured by monitor cameras, are not always handled with consideration to privacy protection. A range of protection technologies have therefore been proposed to protect the images or image data of these subjects to be protected.

One known protection technology is to obscure a subject to be protected if it is included in a camera shooting field, by masking the subject to be protected. In other words, portrait rights are protected by hiding protected subjects. Likewise, a technology for making protected subjects unidentifiable, in spite of the protected subject having been captured, is proposed in Patent Literature 1, for example.

A conventional camera has a function to obscure an image, such as by applying a computer-generated mosaic. More specifically, the conventional camera is designed to apply a mosaic to a part of the image in the image data obtained by photography, immediately after pressing a button for a mosaic mode, unless an appropriate password is input. FIGS. 10A and 10B show an example of image 201 taken using this type of conventional camera. FIG. 10A is an example of image 201 taken using a normal mode without using the mosaic mode. FIG. 10B shows an example of image 201 taken using the mosaic mode. As shown in FIG. 10B, the user can set area 203 for obscuring subject 202 to be protected, which is a part of image 201, when the mosaic mode is selected.

Another technology for protecting images of subjects and their image data is the use of a digital watermark embedded in an image so as to clearly indicate that the subject requires protection and block photography of this image. This technology is disclosed in Patent Literature 2. Still another technology for blocking the photography of a protected subject is the use of a device that transmits information on the protected subject, such as an IC tag. This technology is disclosed in Patent Literature 3.

However, the structure of the conventional camera disclosed in Patent Literature 1 requires the user to manually designate the image area of a protected subject and set an area for applying protection before starting photography. This may result in a failure to designate it appropriately during video photography. The structure of the camera disclosed in Patent Literature 2 and Patent Literature 3 enable protection of the entire shooting field. However, even if a protected subject is just a part of the shooting field, it is not possible to apply protection to the protected subject only. In addition, these conventional technologies cannot automatically detect protected subjects. Accordingly, if a protected subject moves or changes, it cannot be automatically followed.

Patent Literature 1: Japanese Patent Unexamined Publication No. 2003-87632
Patent Literature 2: Japanese Patent Unexamined Publication No. 2005-151124
Patent Literature 3: Japanese Patent Unexamined Publication No. 2005-223601

SUMMARY OF THE INVENTION

The present invention offers a camera device and an imaging method applicable to the camera device for applying protection to an image area of a subject to be protected in an image including this subject, even if the subject moves or changes, by following the subject.

The camera device of the present invention includes an imaging unit, a communications unit, an identified area detection unit, and an image data processing unit. The imaging unit images an area in a shooting field to obtain an image data. The communications unit obtains subject information including a size, shape, direction and position of a specific subject. The identified area detection unit dynamically detects an identified area corresponding to the subject included in the image data obtained by the imaging unit. The image data processing unit specifies a protected area in the identified area detected using the identified area detection unit, based on the subject information obtained by the communications unit; and applies protection only to the protected area when the subject is a protection target to be protected. This structure provides camera device that generates image data in which a subject requiring copyright, portrait right, or other privacy protections is obscured in a photographed subject.

The imaging method of the present invention is a method of protecting a subject to be protected in a target on taking an image. The imaging method includes an imaging step, a communications step, an identified area detection step, and an image data processing step. The imaging step images an area in the shooting field to obtain image data. The communications step obtains subject information including a size, shape, direction and position of the subject. The identified area detection step dynamically detects an identified area corresponding to a specific subject included in the obtained image data. The image data processing step specifies the protected area in the detected identified area, based on the subject information obtained; and applies protection only to the protected area when the subject is a protection target to be protected. This offers an imaging method of generating image data in which subjects requiring copyright, portrait right, or other privacy protections is obscured.

REFERENCE MARKS IN THE DRAWINGS

Figure 1:
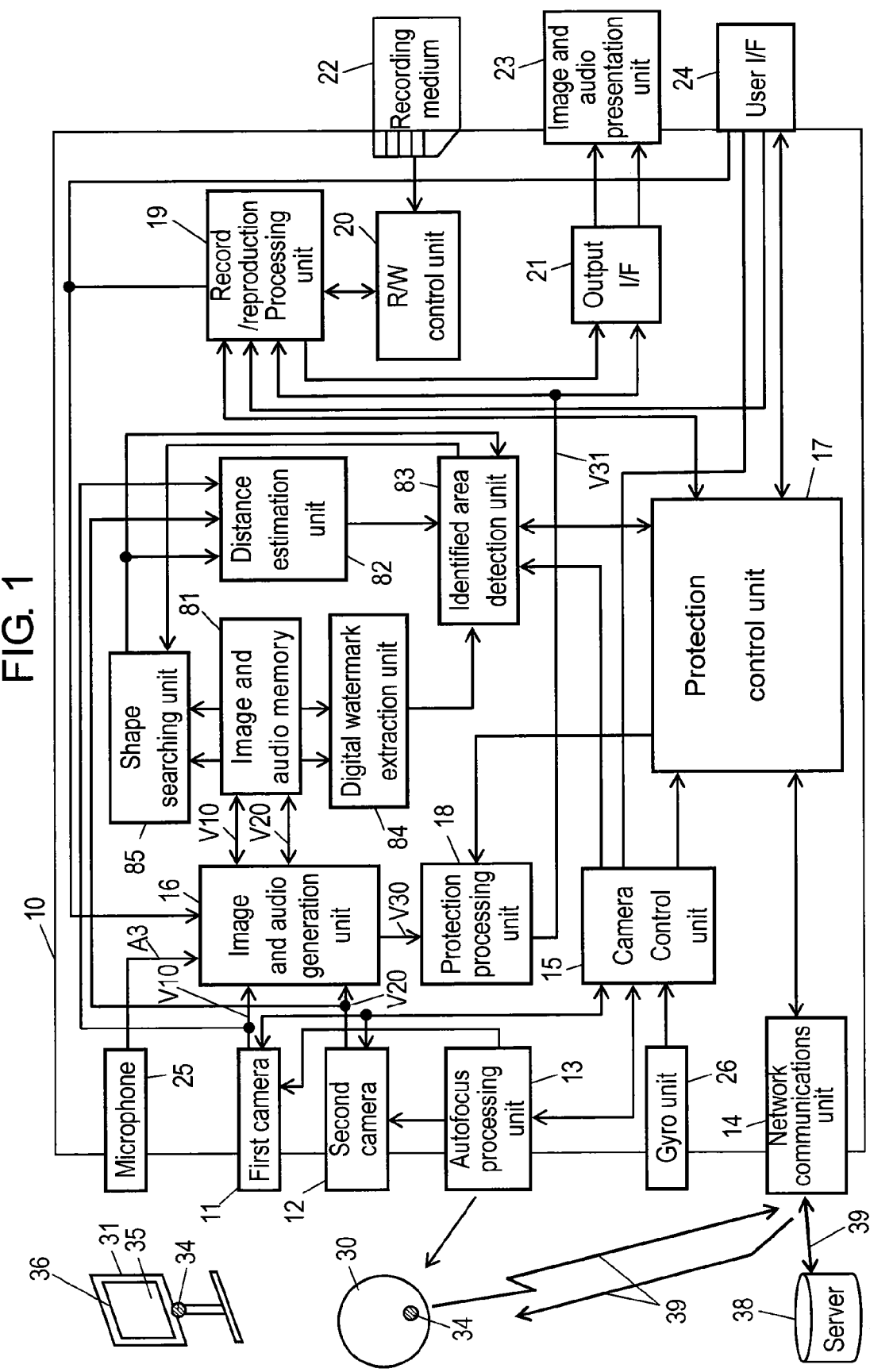
FIG. 1 is a block diagram illustrating a structure of a camera device in accordance with an exemplary embodiment of the present invention.

| | |
|---|---|
| 10 | Camera device |
| 11 | First camera |
| 12 | Second camera |
| 13 | Autofocus processing unit |
| 14 | Network communications unit |
| 15 | Camera control unit |
| 16 | Image and audio forming unit |
| 17 | Protection control unit |
| 18 | Protection processing unit |
| 19 | Record/reproduction processing unit |

-continued
REFERENCE MARKS IN THE DRAWINGS

| | |
|---|---|
| 20 | Read and write control unit |
| 21 | Output interface |
| 22 | Recording medium |
| 23 | Image and audio presentation unit |
| 24 | User interface |
| 25 | Microphone |
| 26 | Gyro unit |
| 28 | Monitor |
| 30, 31, 42 | Subject |
| 34 | IC tag |
| 35 | Image |
| 36 | Image display unit |
| 37 | Art work |
| 38 | Server |
| 39 | Radio waves |
| 40 | Shooting field |
| 44 | Identified area |
| 46 | Protected area |
| 71 | Protection determination unit |
| 72 | Protected area control unit |
| 73 | Protection accuracy control unit |
| 74 | Protected time control unit |
| 75 | Protected area prediction control unit |
| 81 | Image and audio memory |
| 82 | Distance estimation unit |
| 83 | Identified area detection unit |
| 84 | Digital watermark extractor |
| 85 | Shape searching unit |

DETAILED DESCRIPTION OF PREFERRED EMBODIMENTS

An exemplary embodiment of the present invention is described below with reference to drawings.

(Exemplary Embodiment)

Figure 2:
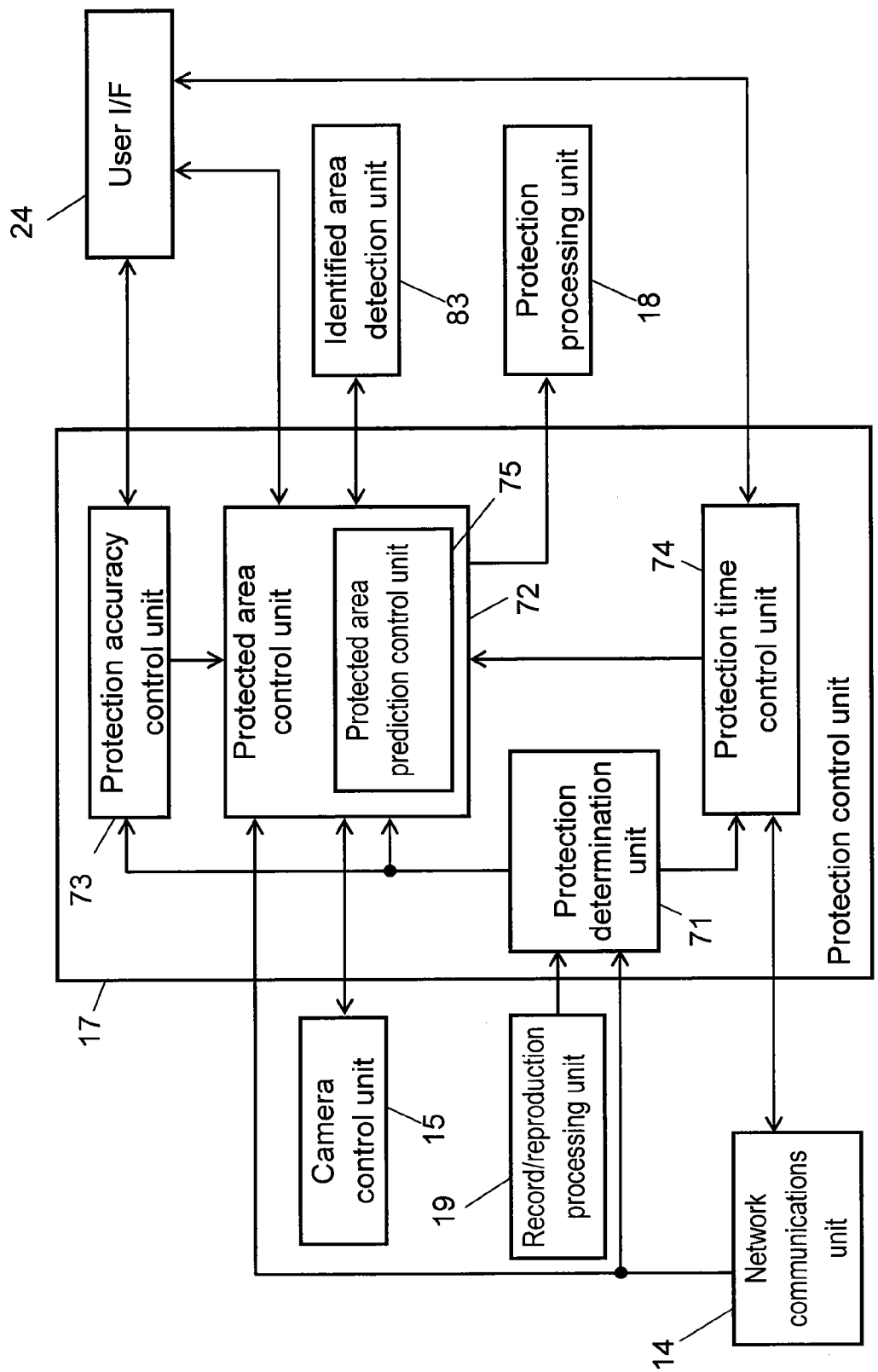
FIG. 2 is a block diagram illustrating a structure of a protection control unit employed in the camera device in FIG. 1.

FIG. 1 is a block diagram illustrating the structure of camera device 10 in the exemplary embodiment of the present invention. FIG. 2 is a block diagram of the structure of protection control unit 17 employed in camera device 10.

Camera device 10 in the exemplary embodiment of the present invention is used as, for example, a digital video camera for taking moving images. Camera device 10 outputs an image after applying protection to an output display image or playback image of image data sets V10 and V20 obtained by imaging subjects 30 and 31, when subjects 30 and 31 that are taken images require copyright, portrait rights or other privacy protections. Camera device 10 of the present invention is also applicable to camera phones or a digital camera linked to a range of electronic devices with digital camera, such as camera PDAs. In addition, camera device 10 is also applicable to digital still cameras for photographing still images, and a video-recording function provided in digital still cameras.

As shown in FIGS. 1 and 2, camera device 10 includes first camera 11 (hereinafter referred to as camera 11), second camera 12 (hereinafter referred to as camera 12), microphone 25, image and audio forming unit 16, and image and audio memory 81 (hereinafter referred to as memory 81). Camera device 10 also includes network communications unit 14 (hereinafter referred to as communications unit 14), camera control unit 15, autofocus processing unit 13 (hereinafter referred to as processing unit 13), and gyro unit 26. Still more, camera device 10 includes identified area detection unit 83 (hereinafter referred to as detection unit 83), shape searching unit 85, distance estimation unit 82, and digital watermark extraction unit 84 (hereinafter referred to as extraction unit 84). Still more, camera device 10 includes protection control unit 17 and protection processing unit 18. Protection control unit 17 includes protection determination unit 71, protected area control unit 72, protection accuracy control unit 73, and protection time control unit 74. Furthermore, camera device 10 includes record/reproduction processing unit 19 (hereinafter referred to as processing unit 19), read and write control unit 20 (hereinafter referred to as R/W control unit 20), output interface 21 (hereinafter referred to as output I/F 21), image and audio presentation unit 23 (hereinafter referred to as presentation unit 23), and user interface 24 (hereinafter referred to as user I/F 24).

Cameras 11 and 12 are imaging unit for obtaining image data by imaging an area in a shooting field. Cameras 11 and 12 capture an image in the shooting field that includes subject 30 and subject 31, and generate image data corresponding to the image captured. Subject 30 and subject 31 are part of an imaging target. Image 35 contained in subject 30 and subject 31 is assumed to be a specific subject that requires protection. In addition, as shown in FIG. 1, IC tag 34 is attached to subject 30. Subject 31 is, for example, image display unit 36, such as a television set, that displays image 35, and IC tag 34 is also attached to subject 31.

Camera device 10 includes, for example, two cameras: Camera 11 and camera 12. Twin-lens imaging is made possible by providing cameras 11 and 12 with a predetermined distance in between. Cameras 11 and 12 thus enable the generation of 3-D image data. In this exemplary embodiment, a structure for obtaining a 3-D image, using two cameras 11 and 12 as shown in FIG. 1, is described. However, camera device 10 may also have a structure for displaying or recording and reproducing normal images that are not 3-D images. For example, one of cameras 11 and 12 may be an imaging unit dedicated to a distance-measuring function. Furthermore, camera device 10 may have a structure including only one of cameras 11 and 12.

Cameras 11 and 12 include, for example, optical lens group (not illustrated), image pickup devices (not illustrated), and AD converter (not illustrated). The image pickup device is typically an image sensor configured with CCD or MOS aligned in matrix. The AD converter has a function to convert an image signal to digital data. In cameras 11 and 12, the amount of light detected by each pixel of the image pickup device is converted to electric signals, which in turn become image signals. Then, image signals are converted to image data, which are digital signals, by an AD converter. Camera 11 outputs image data V10 generated in this way. In the same way, camera 12 outputs image data V20 generated. Image data V10 output from camera 11 and image data V20 output from camera 12 are input to image and audio forming unit 16.

Microphone 25 captures sound around the shooting field taken by cameras 11 and 12, and converts this sound to electric signals. Converted electric signals are input to image and audio forming unit 16 as audio data A3 converted to digital data.

Image and audio forming unit 16 receives two pieces of image data V10 and V20 output from cameras 11 and 12, respectively, and converts them to image data in a predetermined format. For example, to synthesize image data V30 for displaying a 3-D image, data V30 that allows stereovision is formed from two sets of image data V10 and V20. Image and audio forming unit 16 also receives audio data A3 output from microphone 25. Image and audio forming unit 16 first stores image data sets V10 and V20 and audio data A3 in memory 81. Memory 81 is a memory for storing image data sets V10 and V20 and audio data A3 in units of frame. Image and audio forming unit 16 stores image data sets V10 and V20 in memory 81 and extracts stored image data sets V10 and V20 as required. This enables the generation of image data V30, which is 3-D image data. Image and audio forming unit 16 synthesizes image data V30 by using image data V10 output from camera 11 that corresponds to the right eye as the first field and image data V20 output from camera 12 that corresponds to the left eye as the second field. An image of image data V30 is displayed using, for example, glasses with shutter (not illustrated) so as to switch the shutter synchrony with the timing of the right image data and left image data. This makes a 3-D image visible. Image and audio forming unit 16 supplies image data V30 to protection processing unit 18. Image data V30 output from image and audio forming unit 16 is not necessarily a 3-D image. It may be normal image data V10 output from camera 11, or normal image data V20 output from camera 12, or both.

Communications unit 14 is a communications means that communicates with IC tag 34 attached to subjects 30 and 31 so as to obtain tag information stored in IC tag 34. Communications unit 14, for example, transmits high-frequency electromagnetic waves, such as radio waves 39, and receives radio waves 39 such as a response signal to radio waves 39 transmitted. In other words, as shown in FIG. 1, if IC tag 34 is present near camera device 10, IC tag 34 receives radio waves 39 transmitted from communications unit 14. Upon receiving radio waves 39 transmitted from communications unit 14, IC tag 34 responds to radio waves 39 received, and transmits radio waves 30, including the tag information stored in IC tag 34. Communications unit 14 receives radio waves 39 including the tag information transmitted from IC tag 34, and extracts the tag information from the radio signals. IC tag 34 attached to subject 30 includes information on whether or not subject 30 to which IC tag 34 is attached requires copyright, portrait right or other privacy protections; and subject information such as the size, shape, direction and position of subject 30. In the following description, requirement information refers to information on the need of copyright protection and/or privacy protection. If subject 30 includes a protection target that requires copyright or privacy protection, the subject information includes object information on subject 30 and protection target information on a protection target. In other words, the object information includes object size information, object shape information, and object direction information related to subject 30. The protection target information includes protection target size information, protection target shape information, protection target direction information, and protection target positional information. IC tag 34 attached to subject 31 includes the requirement information on copyright or privacy protection of subject 31 to which IC tag 34 is attached as the tag information, and also includes the subject information on a display state of image display unit 36, such as screen size information and screen direction information on subject 31. In the same way, if subject 31 includes image 35 that requires copyright or privacy protection, the subject information includes the object information on subject 31 and the protection target information on the protection target. In other words, if the protection target is displayed on an image display screen of image display unit 36, the protection target information includes screen size information and screen direction information on subject 31. When communications unit 14 receives the tag information from IC tag 34 attached to subjects 30 and 31, communications unit 14 transmits this tag information to protected area control unit 72.

IC tag 34 is also called an electronic tag, wireless tag, or RFID (radio frequency identification). This tag is a small memory device with a communications function, and an electronic circuit (not illustrated) is built inside. The electronic circuit includes a memory (not illustrated) and wireless communications unit (not illustrated). The IC tag is attached to, for example, an article (not illustrated); and an IC tag detection unit (not illustrated) reads the tag information stored in the IC tag. Reading the tag information stored in the IC tag, reveals the identification code, owner, or identity of the article to which the IC tag is attached. In the description, as a matter of convenience, communications unit 14 communicates with IC tag 34. However, the target that communications unit 14 communicates to obtain the subject information is not limited to IC tag 34. As long as a small memory device includes a memory and wireless communications unit, and can communicate with communications unit 14, any communications target of communications unit 14 is acceptable. For example, a radio communications device or optical device, such as Bluetooth (Registered trademark of Bluetooth SIG, Inc) in which a memory is provided, and an optical communications device is also applicable.

Subject 31 is image display unit 36 such as a television set. Image display unit 36 shown in FIG. 1 displays image 35, which typically requires copyright protection, as subject 31 together with digital watermark for protecting image 35.

Table 1 shows an example of the tag information stored in IC tag 34. As shown in Table 1, the tag information includes a header area and data area, and stores information on subjects 30 and 31 to which IC tag 34 is attached. If subjects 30 and 31 are captured by camera device 10, information on subjects 30 and 31 is recognized as the subject information within a shooting field.

auxiliary information of subjects 30 and 31 or information for identifying EPG information (also called EPG info), and its information length is 4 bytes. "Encryption" is information on encryption that shows whether or not information recorded in the data area is encrypted, and its information length is 4 bytes.

In the data area, "Content ID," "Type," "Content Attribute," and "Cyclic Redundancy Check" (hereinafter referred to as CRC) are recorded. Information recorded in the data area is information to be encrypted. "Content ID" is information for identifying subjects 30 and 31 to which IC tag 34 is attached, and its information length is 64 bytes. "Type" is content auxiliary information or information for identifying EPG information, and its information length is 4 bytes. "Content Attribute" is information on content attribute of subjects 30 and 31, and its information length is variable. "CRC" is information for checking alteration of the tag information, and its information length is 4 bytes. In addition, "Content Attribute" includes "Content information" (hereinafter referred to as "Content Info"), "Environmental information" (hereinafter referred to as Env Info), and "EPG Info." "Content Info" is information on contents of individual subjects 30 and 31, and its information length is variable. "Env Info" is information on environment around subjects 30 and 31, and its information length is variable. "EPG Info" is EPG information on image 35 contained in subject 31, and its information length is variable.

"Content Info" includes "Protect," "Target Content Size," "Content Direction," "Protect Content Size," "Protect Con-

TABLE 1

Example of the tag information stored in IC tag 34

| | Item | Length | Note |
|---|---|---|---|
| Header area | Tag-ID | 8 Byte | IC tag information |
| | Length | 8 Byte | Length of transmitted information |
| | Content ID | 64 Byte | Content ID |
| | Type | 4 Byte | Type |
| | Encryption | 4 Byte | Whether encrypted or not |
| | Content ID | 64 Byte | Content ID |
| | Type | 4 Byte | Type |
| | Content Attribute | VL | Content attribute |
| Data Area | Content Info | VL | Content information |
| | Protect | 4 Byte | Copyright/privacy protection |
| | Target Content Size | 32 Byte | Object size/shape |
| | Content Direction | 16 Byte | Object direction |
| | Protect Content Size | 32 Byte | Size/shape of protection target |
| | Protect Content Direction | 16 Byte | Direction of protection target |
| | Accel | 32 Byte | Acceleration/angular speed of protection target |
| | Reserved | VL | Reserved area |
| | Env Info | VL | Environment information |
| | Temp | 4 Byte | Target temperature/Environmental temperature |
| | Reserved | VL | Reserved area |
| | EPG Info | VL | EPG information |
| | Schedule | VL | Program schedule/Protection required or not |
| | Reserved | VL | Reserved area |
| | CRC | 4 Byte | Alteration checking |

VL: variable length

In the header area, "Tag-ID," "Length," "Content ID," "Type," and "Encryption" are recorded. "Tag-ID" is information on an identifier for identifying IC tag 34, and its information length is 8 bytes. "Length" is information on a length of the tag information to be transmitted from IC tag 34, and its information length is 8 bytes. "Content ID" is information for identifying subjects 30 and 31 to which IC tag 34 is attached, and its information length is 64 bytes. "Type" is content tent Direction," "Acceleration" (hereinafter referred to as "Accel"), and "Reserved." "Protect" is information on whether or not subjects 30 and 31 require copyright or privacy protection, and its information length is 4 bytes. "Protect" also includes information on whether a protection target is a partial area or entire area, in addition to information on whether or not subjects 30 and 31 are protection targets. Accordingly, "Protect" is indicated, for example, by "No protection" (None), "Partial protection" (Partial), and "Entire protection" (All). "Target Content Size" is the object size information that indicates the size of subjects 30 and 31 and the object shape information that indicates the shape of subjects 30 and 31, and its information size is 32 bytes. The object shape information may also be recorded as area information. "Content Direction" is the object direction information that indicates the direction of subjects 30 and 31, and its information length is 16 bytes. "Protect Content Size" is the protection target size information that indicates the size of protection target contained in subjects 30 and 31 and the protection target shape information that indicates the shape of protection target, and its information length is 32 bytes. The protection target shape information may also be recorded as the area information. "Protect Content Direction" is the protection target direction information that indicates the direction of protection target contained in subjects 30 and 31, and its information length is 16 bytes. "Accel" is information on the movement of protection target contained in subjects 30 and 31, and its information length is 32 bytes. "Accel" is, for example, the protection target acceleration information or the protection target angular speed information. It is the protection target positional information that indicates the position of protection target. "Reserved" is a reserved area secured as a spare area for recording content information further required related to subjects 30 and 31 or the protection target contained in subjects 30 and 31, and its information length is variable.

"Env Info" includes "Temp" and "Reserved." "Temp" is environmental temperature information on the temperature around subjects 30 and 31 or target temperature information on the temperature of the protection target contained in subjects 30 and 31; and its information length is 4 bytes. "Reserved" is a reserved area secured as a spare area for recording environmental information that may be further required related to the environment around subjects 30 and 31 or environmental condition of the protection target itself; and its information length is variable.

"EPG Info" includes "Schedule" and "Reserved." "Schedule" is an information area for recording the program schedule information related to an image contained in subject 31, and its information length is variable. Furthermore, "Schedule" includes the protection requirement information that indicates whether or not copyright or privacy protection is required for an image contained in subject 31. "Reserved" is a reservation area secured as a spare area for recording the EPG information that may be further required related to the EPG information on the image contained in subject 31; and its information length is variable.

These are examples of the tag information stored in IC tag 34. However, the tag information is not limited to the above structure. As long as camera device 10 has at least the subject information including the protection target information needed for specifying a protected area to apply protection, as described below, any structure is applicable.

Communications unit 14 can also communicate with server 39 having a server communications unit (not illustrated). For example, communications unit 14 transmits high-frequency electromagnetic waves, such as radio waves 39, to server 38, and receives radio waves 39 including a response signal, which is a response to the signal transmitted. The response signal from server 38 is, for example, information on electronic program guide (EPG) for public broadcast that image display unit 36 displays. Server 38 is connected to a network distribution server, such as broadcast or communication contents provider, and can thus obtain the EPG program information from a distribution server via network.

Camera control unit 15 controls cameras 11 and 12 and processing unit 13 in response to imaging instruction information from user I/F 24. For example, when user I/F 24 notifies zoom-in information, camera control unit 15 controls the optical lens group of cameras 11 and 12 so as to narrow the shooting field to be captured by cameras 11 and 12. On the other hand, if user I/F 24 notifies zoom-out information, camera control unit 15 controls the optical lens group of cameras 11 and 12 so as to widen the shooting field to be captured by the cameras 11 and 12. Camera control unit 15 notifies the information that camera control unit 15 has used for controlling cameras 11 and 12, such as magnification rate in case of zoom-in, to detection unit 83 and protected area control unit 72. The control information is a part of imaging condition information that camera device 10 uses for taking an image.

When camera control unit 15 notifies processing unit 13 of the autofocus operation, processing unit 13 controls the focus of the optical lens group of cameras 11 and 12, respectively, such that cameras 11 and 12 are focused to an imaging target positioned close to the center of the shooting field. The imaging target positioned close to the center of the shooting field of cameras 11 and 12 may be subjects 30 and 31. Alternatively, processing unit 13 may also control the focus of the optical lens group of cameras 11 and 12, respectively, so as to focus on the imaging target in a large area. This large imaging target may include subjects 30 and 31. Processing unit 13 generates distance information between subjects 30 and 31 and camera device 10, and notifies it to camera control unit 15. Camera control unit 15 notifies this distance information notified from processing unit 13 to detection unit 83 and protected area control unit 72. The distance information is also a part of the imaging condition information that camera device 10 uses for taking an image.

Gyro unit 26 has a built-in gyro sensor, such as an angular speed sensor or acceleration sensor, and outputs direction information and positional information of camera device 10 to which gyro unit 26 is installed, based on an output signal of the gyro sensor built in gyro unit 26. The direction information and the positional information output is input to camera control unit 15. The direction information and the positional information on camera device 10 input to camera control unit 15 are notified to detection unit 83 and protected area control unit 72. The direction information on camera device 10 is information that indicates the relative direction of camera device 10. The relative direction of camera device 10 may be, for example, a degree of directional change from the start of imaging, or the relative directional relationship between subjects 30 and 31 and camera device 10. In the same way, the positional information on camera device 10 is also information that indicates the relative position of camera device 10. The relative positional information of camera device 10 is, for example, a degree of positional change from the start of imaging or the relative positional relationship between subjects 30 and 31 and camera device 10. The direction information and the positional information on camera device 10 are both part of the imaging condition information that camera device 10 uses for taking an image.

Detection unit 83 functions as an identified area detection means for dynamically detecting an identified area corresponding to specific subjects 30 and 31 included in image data obtained through cameras 11 and 12. In other words, detection unit 83 detects identified areas corresponding to specific subjects 30 and 31, which are protection targets, based on the protection target information, candidate information, digital watermark area information, the distance information, the imaging condition information, and so on notified to detection unit 83. Detection unit 83 detects the identified area based on basic information in the tag information, including the protection target size information, the protection target shape information and the protection target direction information on specific subjects 30 and 31; and the operation information that dynamically changes or the distance information following the movement. Accordingly, the identified area can be accurately detected even if an image is a moving image and subject 30, which is a protection target, moves or changes its size. Detection unit 83 notifies information on a detected identified area to protected area control unit 72 as identified area information. Detection unit 83 receives the protection target information from protected area control unit 72, the candidate information from shape searching unit 85, the digital watermark area information from extraction unit 84, the distance information from distance estimation unit 82, and the imaging condition information from camera control unit 15, respectively. When detection unit 83 dynamically detects an identified area corresponding to subjects 30 and 31, the identified area does not have to be detected based on all of the protection target information, the candidate information, the digital watermark area information, the distance information, and the imaging condition information. For example, to dynamically detect the identified area corresponding to subject 30, the identified area can be dynamically detected based on the protection target information and the candidate information. If a moving target in the shooting field is only subject 30, the identified area corresponding to subject 30 can be dynamically detected based only on the distance information or the operation information. To dynamically detect the identified area corresponding to subject 31, the identified area can be dynamically detected based only on the digital watermark area information. The multiple uses of the protection target information, the candidate information, the digital watermark area information, the distance information and the operation information further improve the detection accuracy on dynamically detecting the identified area. Shape searching unit 85 searches a partial image area corresponding to the protection target information notified from detection unit 83 in at least image data V10 or image data V20 stored in memory 81. In other words, if a shape like a facial shape, for example, is designated, shape searching unit 85 searches an area where the facial shape exists in image data V10 or image data V20 stored in memory 81. As a result of searching the presence of facial shape, if shape searching unit 85 determines that the facial shape exists, shape searching unit 85 generates positional information on where the facial shape exists and size information of face. Shape searching unit 85 notifies generated positional information and size information to detection unit 83 as the candidate information. In this way, shape searching unit 85 searches image data sets V10 and V20 for the partial image area corresponding to the protection target shape information notified from detection unit 83. Shape searching unit 85 then notifies detection unit 83 and distance estimation unit 82 of the size information and the positional information of a partial image that is searched and detected as the candidate information.

Distance estimation unit 82 estimates a distance from camera device 10 to subject 30 with reference to image data V10 and image data V20. The position of subject 30 deviates sideways when two images in image data sets V10 and V20 of twin lenses generated by two cameras 11 and 12 are overlaid. Closer the distance is between camera device 10 and subject 30, larger the sideways deviation is in subject 30 of image data V10 and image data V20. Accordingly, the distance from camera device 10 to subject 30 can be estimated based on amount of sideways deviation of subject 30. Distance estimation unit 82 notifies detection unit 83 of a distance to subject 30 estimated based on this principle as the distance information.

Extraction unit 84 refers to at least image data V10 or image data V20 stored in memory 81, and determines whether or not a digital watermark exists in the image data referred to. If extraction unit 84 determines that the digital watermark exists in an image of image data sets V10 and V20, extraction unit 84 generates information on image display unit 36 displaying the digital watermark on an image or on area such as a display portion. Extraction unit 84 then notifies detection unit 83 of this information on area and information on this area at least including the size information, the shape information, and the positional information as the digital watermark area information. If IC tag 34 storing the tag information including information on a display state of image display unit 36 is attached, such as the case of subject 31, information on display state is notified from detection unit 83 to extraction unit 84 as the protection target information. Extraction unit 84 uses this protection target information notified from detection unit 83 for adjusting the size information and the shape information on an area requiring copyright or privacy protection or an area to replace an image, and these pieces of information are notified to detection unit 83 as the digital watermark area information.

If a protection target to apply copyright or privacy protection exists in a shooting field captured by camera device 10, protection control unit 17 specifies a protected area in the identified area information detected by detection unit 83, based on information such as the tag information obtained by communications unit 14. Protection control unit 17 operates in response to an instruction signal based on user instruction notified via user I/F 24. The instruction signal notified via user I/F 24 is, for example, processing output area designation information, image data accuracy level designation information, or camera operator schedule information. The camera operator schedule information is, for example, output processing timing designation information.

As shown in FIG. 2, protection control unit 17 includes protection determination unit 71, protected area control unit 72, protection accuracy control unit 73, and protection time control unit 74. Protected area control unit 72 includes protected area prediction control unit 75.

The instruction information related to imaging that is set by the user, who is an operator of camera device 10, via user I/F 24 is notified to protection control unit 17. When the instruction information related to imaging is notified to protection control unit 17, protection control unit 17 notifies camera control unit 15 of the instruction information. Then, when the tag information is notified from IC tag 34 to communications unit 14, the tag information is notified to protection control unit 17. When the tag information received by communications unit 14 is notified to protection control unit 17, protection determination unit 71 first analyzes the tag information notified. If protection determination unit 71 determines that copyright or privacy protection is "required" in the requirement information on copyright/privacy protection that is generated as one of analysis results of the tag information, this determination result is notified to protected area control unit 72, protection accuracy control unit 73, and protection time control unit 74. Upon receiving the determination result that copyright or privacy protection is "required", protected area control unit 72 notifies detection unit 83 of the protection target information on a protection target extracted from the tag information. Detection unit 83 analyzes a target to be protected in the shooting field, based on the protection target information received from protected area control unit 72. If a target to be protected is detected, detection unit 83 notifies it to protected area control unit 72 as an identified area. In the same way, protection accuracy control unit 73 notifies the information on accuracy of protected area to protected area control unit 72 so as to control the accuracy in specifying the protected area. Protection time control unit 74 also notifies information on the time to apply protection to protected area control unit 72 so as to control the time to specify the protected area.

More specifically, protected area control unit 72 specifies a protected area in the identified area detected by detection unit 83. Protected area control unit 72 is a protected area control means for controlling an area that protection processing unit 18 applies protection. Protected area control unit 72 specifies the protected area in the identified area based on the protection target information included in the tag information notified from communications unit 14, and the imaging condition information including the operation information, the distance information and the positional information notified from camera control unit 15. In addition, protected area control unit 72 specifies the protected area in the identified area based on processing output area designation designated by the user via user I/F 24. In designating the processing output area, the user selects, for example, "Entire shooting field," "Projective area of protection target," or "Area around the protection target inclusive." If "Area around the protection target inclusive" is selected, a margin area of an accuracy-level designation value (e.g. 10%) set by the user is added to a boundary area of the protection target, and thus a broader area is specified as the protected area. At this point, protected area control unit 72 specifies the protected area in the identified area based on the protection accuracy information on the protected area notified from protection accuracy control unit 73. The protection accuracy information on protected area is, for example, projective area information or margin calculation information calculated based on a value on accuracy level designated by the user. In other words, if "Projective area of protection target" is selected, protection accuracy control unit 73 notifies the projective area information to protected area control unit 72, and protected area control unit 72 specifies the protected area in identified area based on this notified projective area information. If "Area around the protection target inclusive" is selected, protection accuracy control unit 73 notifies the margin calculation information to protected area control unit 72, and protected area control unit 72 considers this notified margin calculation information for specifying the protected area in the identified area. Protected area control unit 72 also specifies the protected area in identified area based on the protection time information on the protection time notified from protection time control unit 74. Protected area control unit 72 notifies the protected area information on specified protected area to protection processing unit 18.

Protection accuracy control unit 73 is a protection accuracy control means provided for controlling the accuracy of protection processing when protection is applied to the protected area. Protection accuracy control unit 73 calculates an area requiring protection in subjects 30 and 31 as a projective area relative to the shooting field, depending on the direction information on subjects 30 and 31 to be protected. The projective area information can be notified to protected area control unit 72 as the protection accuracy information on protected area. In addition, protection accuracy control unit 73 calculates a margin from a boundary area of the protection target to a boundary area of protected area, depending on the accuracy level designation information previously set by the user, and notifies a margin calculation result as protection accuracy information to protected area control unit 72. If the user does not designate the accuracy level in advance, a margin area around subjects 30 and 31 to be protected may be set in accordance with a state of shooting field, i.e., the use environment of camera device 10. In this case, the margin area is adjusted to a predetermined area or a predetermined shape for specifying the protected area. More specifically, in the environment that subjects 30 and 31 including protection target uses easily identifiable background, the margin area can be set small. Contrarily, in the use environment that subjects 30 and 31 including protection target is not easily identifiable, the margin area may be set large. For example, it is assumed that the protection target in subject 30 is a face, and multiple faces exist in the shooting field. If multiple faces, which are not protection targets, larger than the face of subject 30 exist, a protection target to be at least protected in subjects 30 and 31 is protected by setting a larger margin area.

Protection time control unit 74 is a protection time control means provided for controlling the time to apply protection when protection is applied to the protected area. Protection time control unit 74 notifies protected area control unit 72 of the protection time information on the time to apply protection to the protected area. This protection time information is needed for specifying the protected area by protected area control unit 72 based on the camera operator schedule information including the processing output timing designation information set by the user via user I/F 24 or the EPG information notified from communications unit 14. The protection time information includes information on a timing to turn on and off protection of subjects 30 and 31, which are protection targets, in accordance with user setting. The protection time information also includes information on the time to switch between a dynamic mask control and a static mask control relative to protection processing of subjects 30 and 31, which are protection targets, in accordance with the user setting. If image display unit 36 included in subject 31 is reproducing and displaying contents to be protected, the protection time information includes information on time corresponding to broadcast time of a specific program in which contents to be protected is broadcast, in accordance with the EPG information obtained by communications unit 14. Protection time control unit 74 controls protected area control unit 72 such that protected area control unit 72 specifies the protected area in the identified area based on these pieces of the protection time information.

Protected area prediction control unit 75 is a protected area prediction control means provided for predicting the movement of protected area in the shooting field when the protected area is specified by protected area control unit 72, and preparing a mask area in advance. Protected area prediction control unit 75 predicts the movement of subject 30 based on, for example, dynamically-changing specific information notified from detection unit 83 so as to prepare a mask area in advance. Protected area prediction control unit 75 also receives captured image data sets V10 and V20 from detection unit 83, and predicts the movement of protected area based on changes in frames before and after image data sets V10 and V20, so as to prepare the mask area in advance. Furthermore, protected area prediction control unit 75 can also prepare the mask area in advance by predicting the movement of protected area based on the positional information or the direction information on camera device 10 notified from camera control unit 15. The positional information and the direction information of camera device 10 are pieces of information output from gyro unit 26. Protected area control unit 72 can also specify the protected area based on the mask area information on the protected area prepared by protected area prediction control unit 75.

Protection processing unit 18 applies protection to the protected area specified by protection control unit 17. Protection processing unit 18 replaces the protected area with mask pattern, computer-generated mosaic, or other image; or erases the protected area so as to obscure or erase the protected area (hereinafter this type of processing is called "masking"). Protection processing unit 18 applies masking to image data corresponding to the protected area in image data sets V10, V20, and V30 so as to generate image data V31 after masking. Protection processing unit 18 supplies this image data V31 to processing unit 19 and output I/F 21. The protected area may also be protected by masking that dynamically replaces the protected area with another image.

In this way, protection processing unit 18 protects the protected area specified by protected area control unit 72, relative to image data sets V10, V20, and V30 supplied from image and audio forming unit 16, typically using computer-generated mosaic image. Protection processing unit 18 outputs an image after processing the protected area as image data V31. Protection control unit 17 and protection processing unit 18 function as an image data processing unit for applying protection to the protected area by specifying the protected area in the identified area detected by detection unit 83, based on the subject information included in the tag information obtained by communications unit 14.

Processing unit 19 functions as a recording unit for recording an image stream, which is generated by applying compression coding to image data V31 as image information to recording medium 22 via R/W control unit 20. Processing unit 19 reads out the image stream recorded in recording medium 22 via R/W control unit 20, and applies extension decoding to the image stream read out. Image data restored by extension decoding is supplied to output I/F 21. In other words, R/W control unit 20 controls writing to and reading from recording medium 22. Processing unit 19 receives audio data A3 output from microphone 25, typically via image and audio forming unit 16. Audio data A3 is recorded to recording medium 22 and output to output I/F 21 as audio information in the same way as image data V31. Processing unit 19 can also record and reproduce image auxiliary information related to the image information and the audio information to and from recording medium 22. The image auxiliary information is, for example, the subject information including the protection target information related to image and sound. The image auxiliary information is also the imaging condition information corresponding to an image taken. These pieces of the subject information and the imaging condition information are handled as the image auxiliary information separate from the image information and the audio information, and are recorded to and reproduced from recording medium 22. The image auxiliary information recorded to recording medium 22 is notified to protection control unit 17 via R/W control unit 20 and processing unit 19 when related image information is reproduced. Recording medium 22 is configured with an SD card, Blu-ray Disc (hereinafter referred to as BD), DVD, HDD, USB memory, or built-in flash memory; and is placed in a recording medium insertion unit (not illustrated) provided on camera device 10.

Output I/F 21 is an interface for outputting image data V31 and audio data A3 to presentation unit 23. Presentation unit 23 includes monitor 28 for displaying images, such as liquid crystal display, organic EL display, head-mount display, and plasma display; and audio output unit (not illustrated), such as an earphone and speaker for outputting sound. Presentation unit 23 displays an image captured by cameras 11 and 12, reproduces sound obtained by microphone 25, or reproduces an image and sound recorded in recording medium 22. Presentation unit 23 can also reproduce and display image data V31 in which protection is applied to the protected area.

User I/F 24 includes an input unit such as a menu (not illustrated) displayed on a touch panel attached to a liquid crystal display unit. Via user I/F 24, the user controls imaging by camera device 10 or on and off of audio recording. Also via user I/F 24, cameras 11 and 12 are switched, a shooting field such as zoom-in and zoom-out is changed, and autofocus function is selected. The user can also control processing unit 19 via user I/F 24. User I/F 24 also functions as a user designation unit for designating the protected area by the user. Other than designation of the protected area, the processing output area designation information, accuracy level designation information of image data, the camera operator schedule information, and so on are also set via user I/F 24. Each item set via user I/F 24 is notified to protection control unit 17.

As described above, camera device 10 of the present invention at least includes the imaging unit, the communications unit, the identified area detection unit and the image data processing unit. The imaging unit captures an area in shooting field 40 so as to obtain image data. The communications unit communicates with IC tag 34 storing the subject information including the size, shape, direction, and position of a specific subject, and obtains the subject information. The identified area detection unit dynamically detects identified area 44 corresponding to specific subjects 30 and 31 included in image data sets V10 and V20 obtained by the imaging unit. The image data processing unit specifies protected area 46 from identified area 44 detected by the identified area detection unit and applies protection to protected area 46, based on the subject information obtained by the communications unit, when subjects 30 and 31 are targets to apply copyright or privacy protection. Accordingly, the present invention offers camera device that can follow subjects 30 and 31 and apply protection to an image including subjects 30 and 31 to be protected so as to obscure an image area of subjects 30 and 31, even if subjects 30 and 31 to be protected moves or changes.

Next describes an imaging method of generating image data V31 in which only an image area corresponding to subjects 30 and 31 to be protected is protected when subjects 30 and 31 captured by camera device 10 as configured above require copyright, portrait right or other privacy protections.

Figure 3:
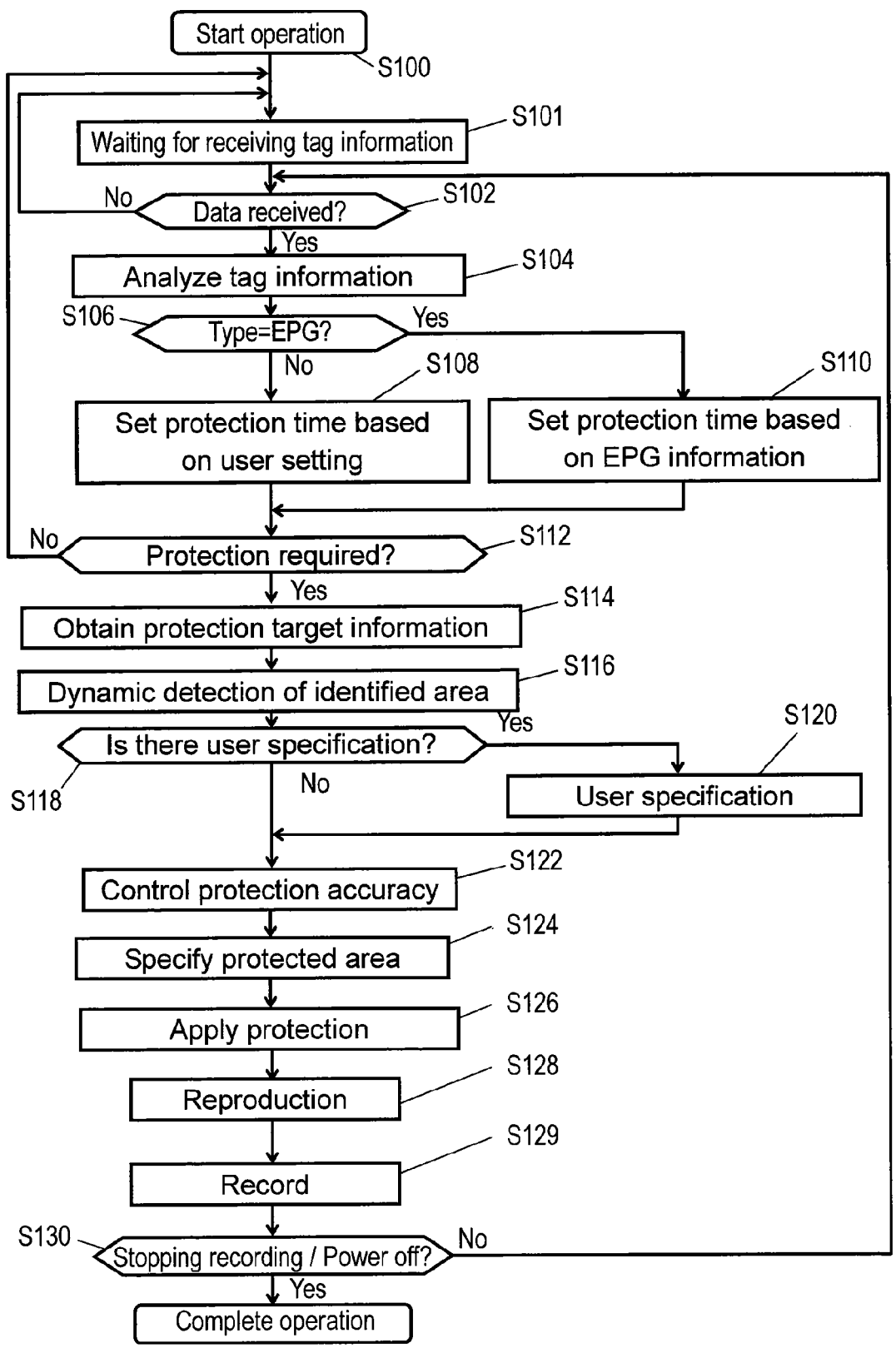
FIG. 3 is a flow chart illustrating an imaging method applied to the camera device in FIG. 1.

FIG. 3 is a flow chart illustrating a procedure for detecting identified area 44 in subjects 30 and 31 to be protected in a shooting field imaged by cameras 11 and 12, and generating image data V31 by processing detected identified area 44.

Figure 4A:
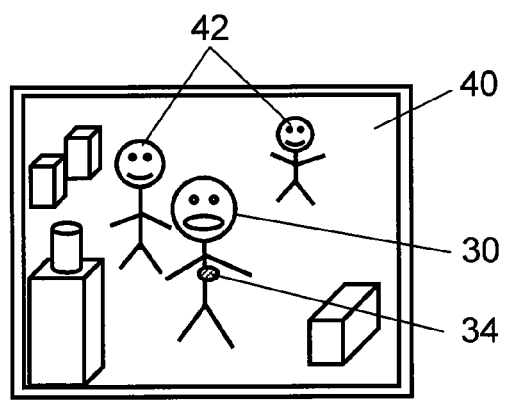
FIG. 4A is an example of protection applied to a subject to be protected.
Figure 4B:
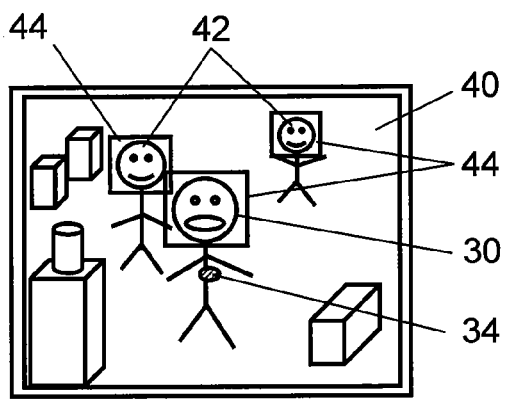
FIG. 4B is an example of protection applied to a subject to be protected.
Figure 4C:
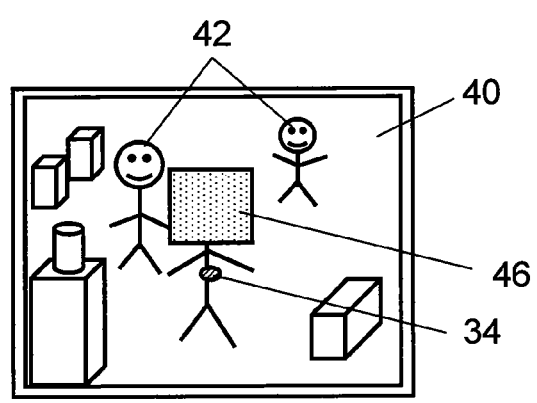
FIG. 4C is an example of protection applied to a subject to be protected.
Figure 4D:
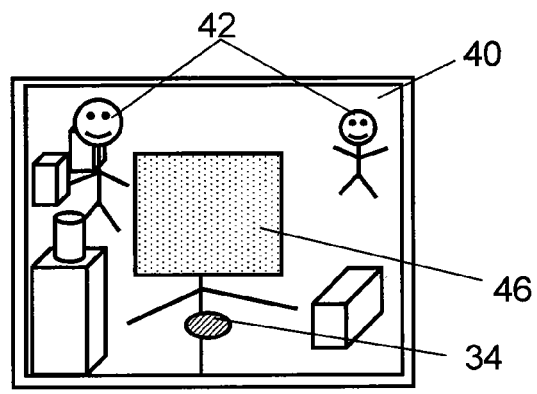
FIG. 4D is an example of protection applied to a subject to be protected.
Figure 4E:
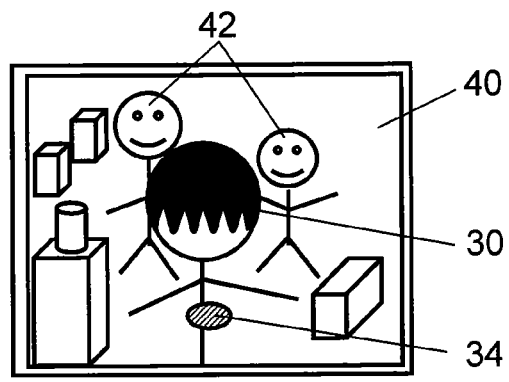
FIG. 4E is an example of protection applied to a subject to be protected.
Figure 4F:
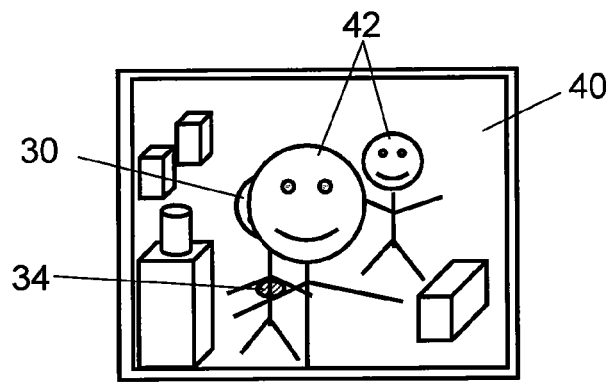
FIG. 4F is an example of protection applied to a subject to be protected.
Figure 4G:
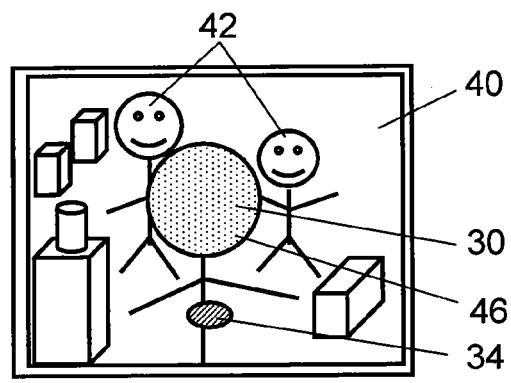
FIG. 4G is an example of protection applied to a subject to be protected.
Figure 4H:
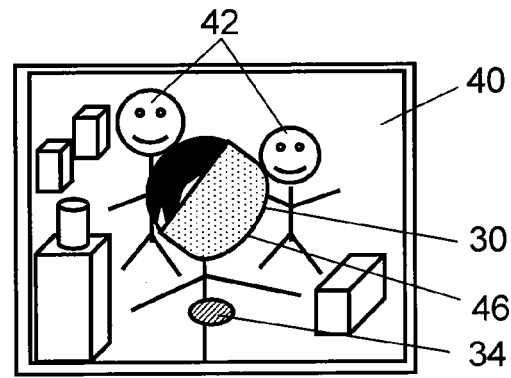
FIG. 4H is an example of protection applied to a subject to be protected.
Figure 4I:
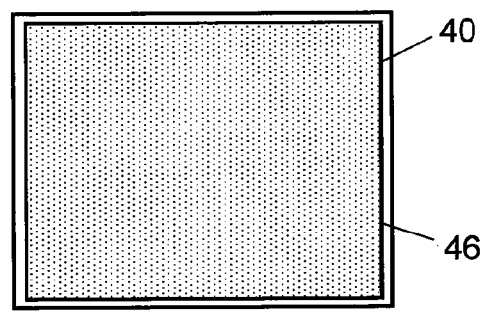
FIG. 4I is an example of protection applied to a subject to be protected.

FIGS. 4A to 4I illustrate examples of applying protection to subject 30, to which IC tag 34 is attached, that requires copyright, portrait right or privacy protection. FIGS. 4A to 4G show examples of protecting a specific person's face, who is subject 30 to which IC tag 34 is attached. In this IC tag 34 attached to the specific person, copyright protection or other protection is set to "Required" in the protection requirement information, and also the size, shape, direction and positional information on the specific person's face is stored as the tag information including information on a protection target. FIG. 4A shows an image when no protection is applied within shooting field 40 of camera device 10. FIG. 4B shows an image when identified area, which is a candidate protection target, is detected by detection unit 83 in shooting field 40 equivalent to FIG. 4A. FIG. 4C shows an example of an image when protection is applied in shooting field 40 equivalent to FIG. 4A. FIG. 4D is an image captured in shooting field 40 equivalent to FIG. 4C after some time from the shooting time of FIG. 4C. FIG. 4E is an image captured in shooting field 40 equivalent to FIG. 4D still after some time from the shooting time of FIG. 4D. FIG. 4F is an image captured in shooting field 40 equivalent to FIG. 4E still after some time from the shooting time of FIG. 4E. FIG. 4G is an image when protected area 46 is specified based on a protection accuracy different from that in FIG. 4D in shooting field 40 equivalent to FIG. 4D. FIG. 4H is an image captured in shooting field 40 equivalent to FIG. 4G after some time from the shooting time of FIG. 4G. FIG. 4I is an image when protected area 46 is specified based on a protection accuracy different from that in FIG. 4D in shooting field 40 equivalent to FIG. 4D. As shown in FIGS. 4A to 4I, subject 30 requiring privacy protection and subject 42 not requiring privacy protection are captured in the same shooting field 40.

Figure 5:
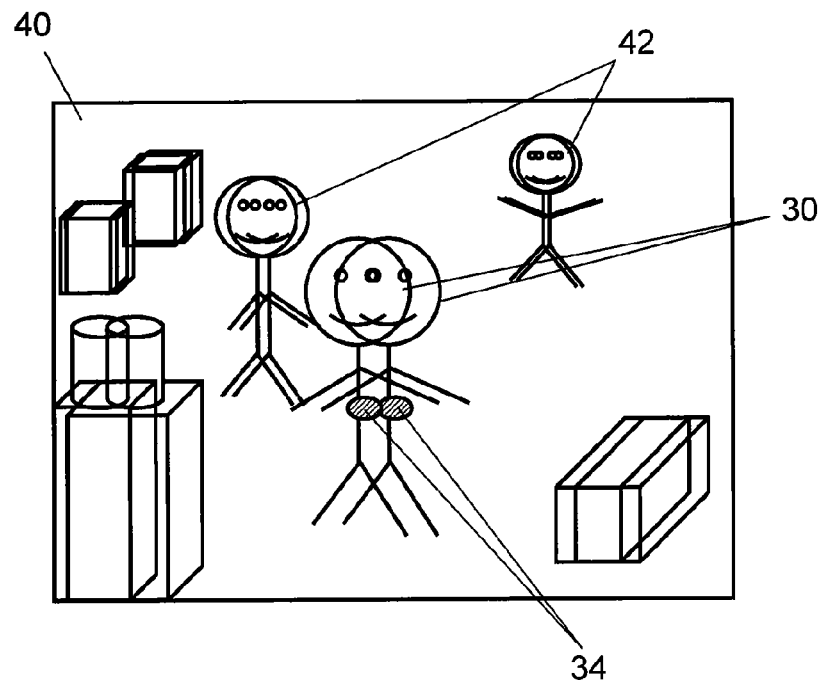
FIG. 5 is an example of an image generated by synthesizing image data.

FIG. 5 is an example of an image after synthesizing twin-lens image data sets V10 and V20 stored in memory 81.

Figure 6A:
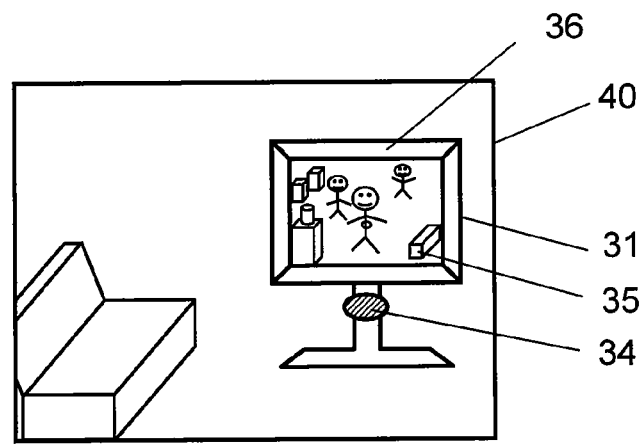
FIG. 6A is an example of protection processing applied to a subject on which an image to be protected is displayed.
Figure 6B:
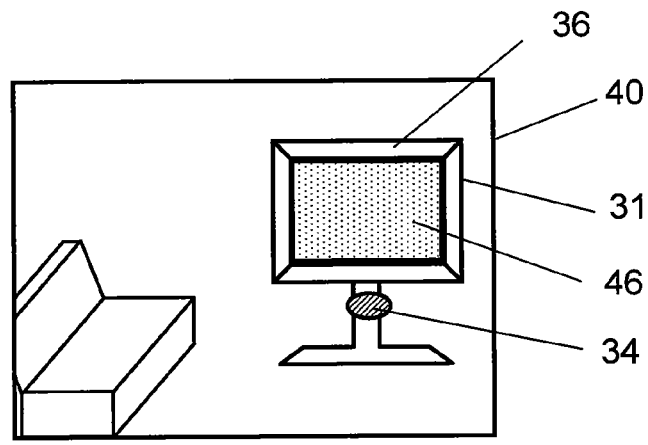
FIG. 6B is an example of protection processing applied to a subject on which an image to be protected is displayed.
Figure 6C:
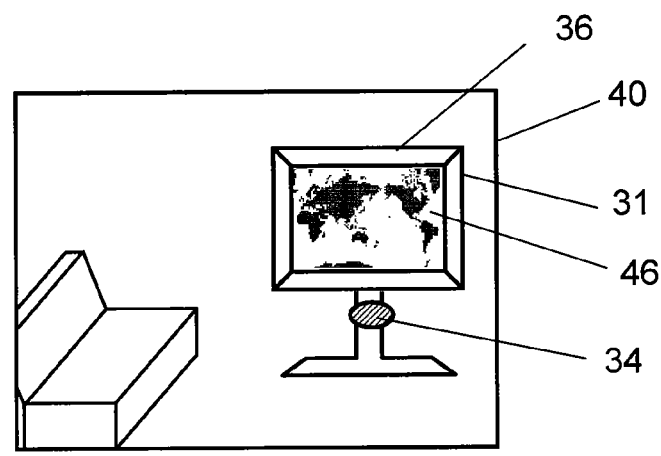
FIG. 6C is an example of protection processing applied to a subject on which an image to be protected is displayed.

FIG. 6A shows an image when subject 31 captured in shooting field 40 is image display unit 36 on which image 35 requiring copyright protection is displayed. FIG. 6B shows an image when protection is applied to image 35 to be protected in shooting field 40 equivalent to FIG. 6A. FIG. 6C is an example of an image that protection is applied to image 35 to be protected by means of a dynamic mask control.

Figure 7B:
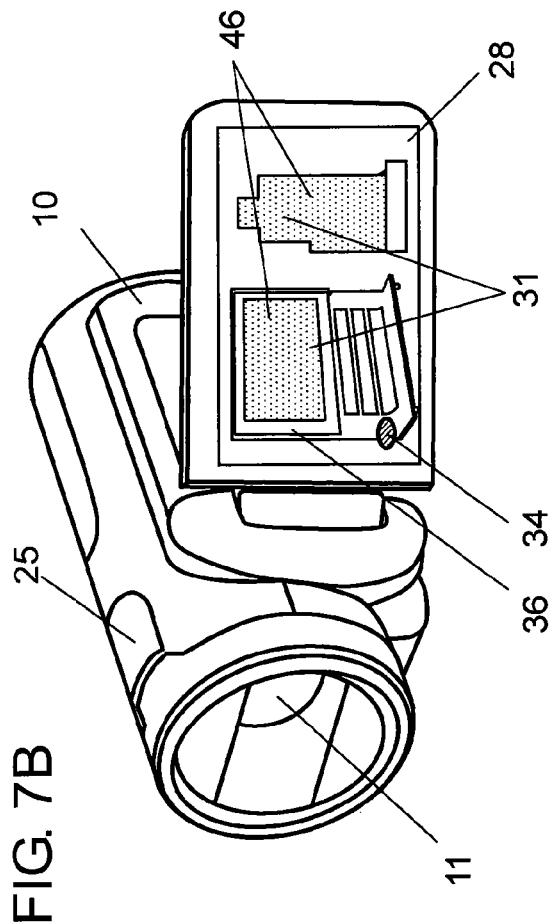
FIG. 7B is an outline of a state of the camera device when a subject to be protected is captured.
Figure 7A:
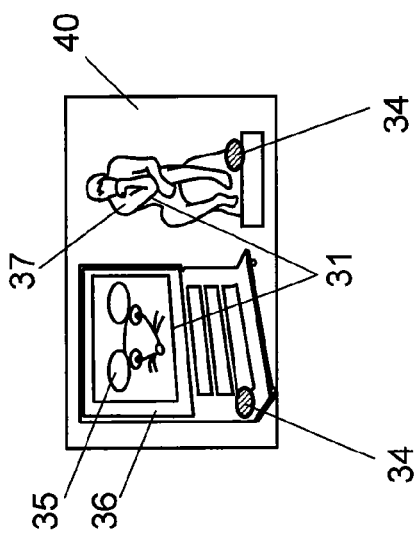
FIG. 7A is an example of protection processing applied to a subject on which an image to be protected is displayed.
Figure 7D:
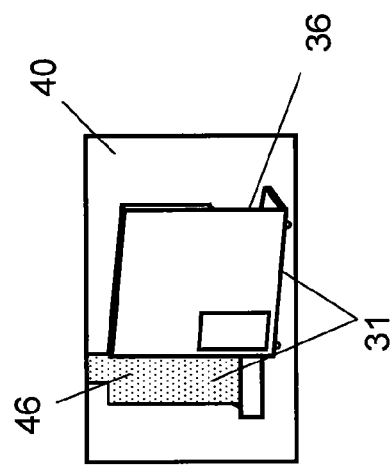
FIG. 7D is an example of protection processing applied to a subject on which an image to be protected is displayed.
Figure 7C:
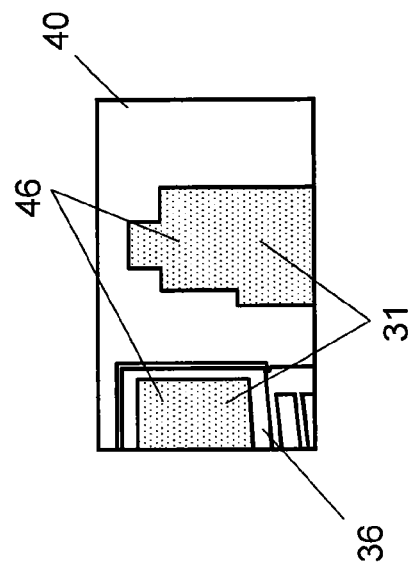
FIG. 7C is an example of protection processing applied to a subject on which an image to be protected is displayed.

FIG. 7A shows an image when subjects 31 captured in shooting field 40 are image display unit 36 on which image 35 requiring copyright protection is displayed and art work 37 requiring copyright protection. FIG. 7B shows camera device 10 capturing shooting field 40 equivalent to FIG. 7A. FIG. 7C is an image taken after some time from the shooting time of FIG. 7A. FIG. 7D is an image taken after some time from the shooting time of FIG. 7A.

Figure 8A:
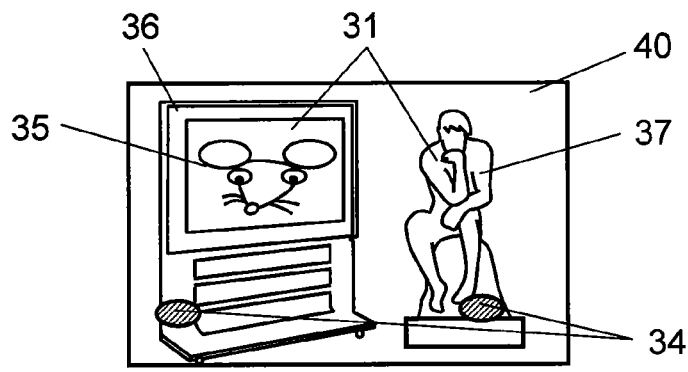
FIG. 8A is an example of protection processing applied to a subject on which an image to be protected is displayed.
Figure 8B:
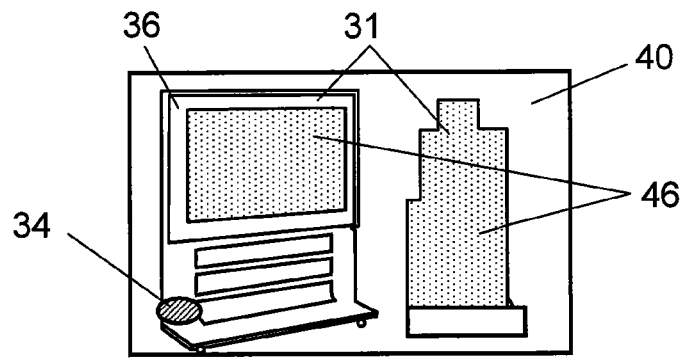
FIG. 8B is an example of protection processing applied to a subject on which an image to be protected is displayed.
Figure 8C:
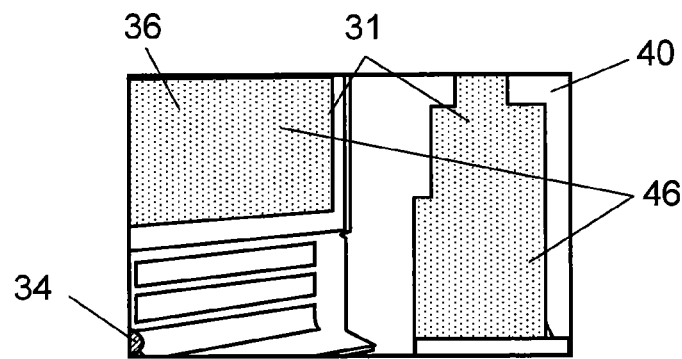
FIG. 8C is an example of protection processing applied to a subject on which an image to be protected is displayed.
Figure 8D:
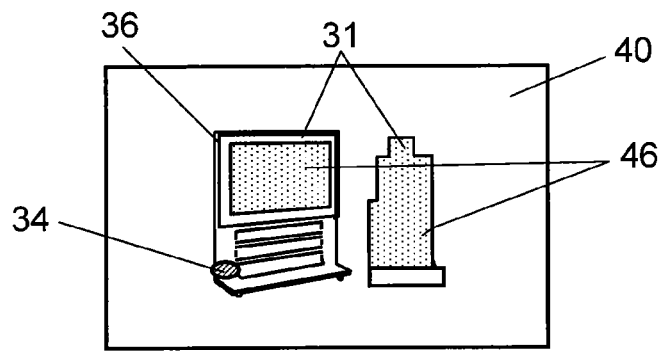
FIG. 8D is an example of protection processing applied to a subject on which an image to be protected is displayed.

FIG. 8A shows an image when subjects 31 captured in shooting field 40 are image display unit 36 on which image 35 requiring copyright protection is displayed and art work 37 requiring copyright protection. FIG. 8B is an example of an image when protection is applied to shooting field 40 equivalent to FIG. 8A. FIG. 8C is an example of an image when shooting field 40 is zoomed in, relative to FIG. 8B. FIG. 8D is an example of an image when shooting field 40 is zoomed out, relative to FIG. 8B.

Next describes the imaging method of generating image data V31 from an image captured using camera device 10, and specific examples of protected image data with reference to FIGS. 3 to 8.

First, as shown in FIG. 3, when the start of imaging using camera device 10 is input from user I/F 24, camera device 10 starts imaging operation (Step S100). In other words, an imaging step is executed. Next, communications unit 14 waits for receiving the tag information including the subject information from subjects 30 and 31 (Step S101). Then, in a communications step, protection control unit 17 controls communications unit 14 to transmit radio waves 39 for starting communication between communications unit 14 and IC tag 34. For example, as shown in FIG. 1, if IC tag 34 exists within the reach of radio waves 39, IC tag 34 responds to radio waves 39 transmitted from communications unit 14 for starting communications, and sends the tag information to communications unit 14. On the other hand, if no IC tag 34 exists within the reach of radio waves from communications unit 14, communications unit 14 receives no response. In other words, protection control unit 17 determines whether or not receivable data that communications unit 14 can receive exists. If protection control unit 17 determines that communications unit 14 has data to receive (Yes), the operation proceeds to Step S104. If protection control unit 17 determines that there is no response (No), Step S101 is repeated until communications unit receives data (Step S102).

If IC tag 34 returns the tag information, communications unit 14 notifies received tag information to protection determination unit 71. Protection determination unit 71 receives and analyzes the tag information (Step S104). Protection determination unit 71 analyzes obtained tag information, and firstly determines the type information in the tag information. A determination result is notified to protection time control unit 74 (Step S106). If the type information does not conform to the EPG information (No), the operation proceeds to a first protection time control step (Step S108). If the type information conforms to the EPG information (Yes), the operation proceeds to a second protection time control step (Step S110).

In the first protection time control step, protection time control unit 74 sets a protection period based on the protection time information set by the user via user I/F 24. In other words, based on the protection time information set by the user via user I/F 24, protection time control unit 74 notifies protected area control unit 72 of timing to apply protection to protected area 46. Then, the operation proceeds to a protection determination step (Step S112). In the second protection time control step, protection time control unit 74 sets the protection period based on the protection time information on airtime of a specific program included in the EPG information that communications unit 14 obtained. In other words, a timing to apply protection to protected area 46, based on the protection time information on airtime of a specific program included in the EPG information obtained by communications unit 14, is notified from protection time control unit 74 to protected area control unit 72. Then, the operation proceeds to the protection determination step (Step S112).

Next, in the protection determination step, protection determination unit 71 analyzes the tag information obtained, and determines the requirement information on copyright protection and/or privacy protection included in the tag information. When protection determination unit 71 determines that protection is "required" (Yes), in the requirement information on copyright or privacy protection, the operation proceeds to Step S114. If protection determination unit 71 determines the protection is "not required" (No), the operation proceeds to Step S101. If the operation proceeds to Step S101, this Step S101 is repeated until communications unit 14 receives data again.

In the protection determination step, if protection is determined to be "required," protected area control unit 72 generates the protection target information in a step of obtaining information on protection target (Step S114). In other words, protected area control unit 72 obtains the protection target information, including the protection target size information, the protection target shape information, the protection target direction information and the protection target positional information on a protection target to which IC tag 34 is attached, i.e., the protection target in subjects 30 and 31. This protection target information obtained is notified to detection unit 83. At this point, protected area control unit 72 may also obtain the object information including the object size information, the object shape information and the object direction information on an imaging target to which IC tag 34 is attached, i.e., subjects 30 and 31. This object information obtained may also be notified to detection unit 83.

Next, in an identified area detection step, detection unit 83 dynamically detects identified area 44 corresponding to specific subjects 30 and 31 included in image data (Step S116). In this way, processing related to the tag information sent form IC tag 34 is executed. Cameras 11 and 12 take an image in the shooting field, including subjects 30 and 31, and image data sets V10, V20, and V30 corresponding to the image for one frame, for example, are stored in memory 81. For example, as shown in FIG. 4A, image data V10 for one frame of an image in the shooting field, including subject 30, is stored in memory 81.

In the identified area detection step, detection unit 83 notifies shape searching unit 85 of the protection target shape information indicating the shape of protection target, included in the protection target information. Shape searching unit 85 searches image data sets V10, V20, and V30 stored in memory 81 for an area where partial image that meets the shape indicated by the protection target shape information exists in the image corresponding to the image data. This area is notified to detection unit 83 as the candidate information. For example, if the shape of face is designated as the protection target information, shape searching unit 85 searches for an area where facial image exists in the image. Shape searching unit 85 notifies detection unit 83 of information on the size, shape, direction and position of a detected partial image that matches the target shape as the candidate information. If shape searching unit 85 detects multiple partial images that match the target shape in its search, they are all notified to detection unit 83 as candidates for protection target, respectively. Information on the size, shape, direction, and position of each of partial images (hereinafter referred to as "candidate partial images") is notified to detection unit 83.

At this point, distance estimation unit 82 may also calculate a distance from camera device 10 to each candidate partial image based on the candidate information notified from shape searching unit 85. In other words, distance estimation unit 82 can calculate positional deviation to the left and right of each candidate partial image on two images, with reference to twin-lens image data V30 generated from image data sets V10 and V20 stored in memory 81, and estimate the distance from camera device 10 to subjects 30 corresponding to each candidate partial image. For example, if three candidate partial images of face are detected, an actual distance from camera device 10 to subjects 30 and 42, which are faces, is estimated, respectively. Distance estimation unit 82 notifies detection unit 83 of this calculated distance to subjects 30 and 42, corresponding to each candidate partial image, as the distance information.

FIG. 5 is an example of an image synthesized from twin-lens image data of image data sets V10 and V20 stored in memory 81. As shown in FIG. 5, closer the distance of a face is from camera device 10, larger the deviation is between image data V10 and image data V20 in synthesized image. Distance estimation unit 82 utilizes this deviation width in image data sets V10 and V20 for estimating a distance to each face captured, and obtains the distance information. The distance information can also be obtained by directly measuring a distance between camera device 10 and subject 30 by processing unit 13 and camera control unit 15. In case of obtaining the distance information by processing unit 13 and camera control unit 15, the distance information is notified to detection unit 83 and protected area control unit 72. Whether to obtain the distance information by distance estimation unit 82 or processing unit 13 depends on setting that the user input to user I/F 24.

Detection unit 83 dynamically detects identified area 44 using a part or all of the candidate information notified from shape searching unit 85, the distance information corresponding to each candidate partial image notified from distance estimation unit 82, and the imaging condition information notified from camera control unit 15. Detection unit 83 notifies the identified area information on identified area 44, as shown in FIG. 4B, to protected area control unit 72.

Next, a presence of protected area 46 specified by the user is confirmed (Step S118). If there is user specification (Yes), user I/F 24 notifies protection control unit 17 of information on user-specified protected area 46 (Step S120). Information to be notified to protection control unit 17 is, for example, the processing output area designation information and the accuracy level designation information on image data. If there is no user specification (No), a predetermined designation condition is applied to protection control unit 17.

In a protection accuracy control step, protection accuracy control unit 73 notifies protected area control unit 72 of the protection accuracy information on protected area 46 for specifying protected area 46 relative to the area information on the size, direction and position of the protection target (Step S122).

In the protected area control step, protected area control unit 72 specifies protected area 46 relative to identified areas 44 notified from detection unit 83 (Step S124). In other words, protected area control unit 72 calculates actual shape, size, direction and position of subjects 30 and 42 (hereinafter referred to as "candidate subjects") in identified areas 44 notified from detection unit 83, as shown in FIG. 4B. Protected area control unit 72 applies corrective calculation to the size of subjects 30 and 42 in identified areas 44, using a distance in the distance information and a zoom rate in the operation information so as to calculate actual size of the candidate subject included in each identified area 44. Next, protected area control unit 72 compares the protection target size information in the protection target information and an actual size value of each candidate subject calculated so as to pick out a candidate subject that has an actual size value conforming to or closest to the protection target size information. In other words, protected area control unit 72 picks out identified area 44 of the candidate subject with the actual size value conforming to or closest to the size of protection target in subject 30 holding IC tag 34 in the candidate subjects in identified areas 44. In the same way, protected area control unit 72 may also specify protected area 46 based on the protection target shape information, the protection target direction information and the protection target positional information in the protection target information. Protected area 46 can be more accurately specified by using many pieces of information as much as possible. Protected area control unit 72 notifies protection processing unit 18 of the information on specified protected area 46, i.e., the size, shape, position and direction of protected area 46 in the image, as the protected area information.

In the protected area control step, protected area prediction control unit 75 may also execute a protected area prediction control step. If protected area control unit 72 specifies protected area 46, the protected area prediction control step is the step of predicting the movement of protected area 46 in the shooting field so as to prepare a masking area in advance. In the protected area prediction control step, protected area control unit 72 may also specify the protected area based on prepared mask area information.

Next, in a protection processing step, protection processing unit 18 applies protection to protected area 46 in image data sets V10, V20, and V30 that correspond to the size, shape and position on the image and are supplied from image and audio forming unit 16, based on the protected area information notified from protected area control unit 72 (Step S126). Protection processing is, for example, masking for obscuring an image using a computer-generated mosaic. Image data V31, in which protected area 46 is protected, is generated, and sent to processing unit 19 or output I/F 21.

By executing Step S108 to Step S126 above, protection is applied to an area requiring copyright, portrait right or privacy protection in subjects 30 and 31, and this area is obscured as protected area 46 in shooting field 40 of the image including subjects 30 and 31 to which IC tag 34 is attached. The protected area control step and the protection processing step configure an image data processing step.

Next, in a reproduction step, image data V31, in which an image protected by the image data processing unit is superimposed on image data sets V10, V20, and V30 captured by cameras 11 and 12, is sent to output I/F 21. Audio data A3 collected by microphone 25 is also sent to output I/F 21. Image data V31 and audio data A3 sent to output I/F 21 are reproduced on presentation unit 23, such as monitor 28 (Step S128).

Next, in a recording step, image data V31 and audio data A3 reproduced in the reproduction step are sent to processing unit 19 in the same way. Data sent to processing unit 19 is controlled by R/W control unit 20 and is recorded on recording medium 22 (Step S129). In this step, image data V31 is recorded on recording medium 22 as the image information. Audio data A3 collected by microphone 25 is recorded on recording medium 22 as the audio information. The image information and the audio information may also be recorded together as image and audio information. The subject information including the protection target information on subjects 30 and 31, which are protection targets, captured in shooting field 40 is also sent from protected area control unit 72 to processing unit 19. The subject information sent to processing unit 19 is controlled by R/W control unit 20, and recorded on recording medium 22 as image auxiliary information separate from the image information and the audio information. At the same time, the imaging condition information, including the operation information and the distance information, used for imaging an image by camera device 10 is also recorded on recording medium 22 as the image auxiliary information.

Next, protection control unit 17 determines whether the instruction information on completion of imaging is notified from user I/F 24. If the instruction information on completion of imaging is notified (Yes), the imaging operation completes (Step S130). If the instruction information on completion of imaging operation is not notified (No), the operation proceeds to Step S102 again, and the above steps are repeatedly executed.

If face-pattern processing typically used in face recognition technology is applied, for example, when multiple faces exist in shooting field 40, as shown in FIG. 4A, all faces in shooting field 40 are picked out. This makes it difficult to pick out a specific face to be protected, i.e., only subject 30 shown in FIG. 4A. A face of subject 42, which does not require protection, is also picked out.

On the other hand, camera device 10 in this exemplary embodiment first receives the protection target information on a specific face to be protected in subject 30, which is included in the tag information sent from IC tag 34. Then, as shown in FIG. 4B, detection unit 83 dynamically detects areas where images similar to the protection target information exist in image data within shooting field 40. These detected images are notified to protected area control unit 72 as identified areas 44. For example, as shown in FIG. 4A, three faces exist in shooting field 40. Therefore, detection unit 83 detects three facial images in shooting field 40, as shown in FIG. 4B, and notifies them to protected area control unit 72 as identified areas 44. Then, protected area control unit 72 calculates the size information, the shape information, the positional information and the direction information of a candidate partial image in each of three identified areas 44 notified, and specify protected area 46, taking into account the protection target information and the imaging condition information.

For example, the size, shape, direction and position of each identified area 44 to be protected are calculated for each frame so as to identify protected area 46. For example, the size of protected area 46 is corrected, based on a zoom rate of cameras 11 and 12, and the distance information. Accordingly, as shown in FIG. 4D, the movement of subject 30 is followed to change protected area 46, even if subject 30 to be protected comes close to camera device 10 and a face area to be protected becomes larger as time passes from that shown in FIG. 4C. The protection target to be protected is thus reliably protected.

Also as shown in FIG. 4E, if subject 30 to be protected turns around relative to camera device 10, and no face, which is a protection target, exists in shooting field 40, protected area control unit 72 specifies that there is no protected area 46 in shooting field 46. In this way, if the direction of a protection target turns around and the protection target no longer exists in shooting field 40, protected area control unit 72 accurately specifies protected area 46 by taking into account the direction information, in particular, on the protection target included in the subject information. As a result, there is no area to be protected within shooting field 40, and no unnecessary protection is applied.

Also as shown in FIG. 4F, if subject 42, which is not a protection target, moves to an area between subject 30, which is a protection target, and camera device 10; subject 30 is hidden behind subject 42 and thus is not captured within shooting field 40. If multiple subjects 30 and 42 are partially overlaid and exist in the shooting field simultaneously, protected area control unit 72 detects an overlaid portion of multiple subjects 30 and 42 and specifies protected area 46 based on the protection target positional information included in the subject information. Accordingly, only an area that requires protection in shooting field 40 is specified as protected area 46. As a result, dynamic protection is applied only to an area that requires protection in shooting field 40.

Also as shown in FIG. 4G, protection may be applied only to a facial portion of subject 30 to be protected in an area with the size and the shape almost equivalent to a boundary area of protection target. In other words, if the user sets an accuracy level of protected area 46 as "projective area of protection target," protection accuracy control unit 73 controls protected area control unit 72 so as to specify a projective area relative to an imaged area that requires protection in subject 30, based on the direction information on subject 30 to be protected. Accordingly, as shown in FIG. 4G, protection is applied only to a facial portion of the protection target.

As shown in FIG. 4H, if subject 30 to be protected turns sideways relative to camera device 10, the size and the shape of the facial portion to be protected in shooting field 40 change. In this case, protected area control unit 72 identifies protected area 46 in shooting field 40 corresponding to the direction of subject 30. If the target to be protected changes its direction, and therefore an area of protection target changes in shooting field 40, protected area control unit 72 accurately identifies protected area 46 by taking into account the protection target direction information, in particular, in the subject information. As a result, as shown in FIG. 4H, protection is applied only to a profile image of the facial portion, which is the protection target.

As shown in FIG. 4I, protection may also be applied to entire shooting field 40 including subject 30 to be protected as protected area 46. More specifically, if the user sets the accuracy level of protected area 46 to "Entire shooting field,"

protection accuracy control unit 73 controls protected area control unit 72 to specify entire shooting field 40 including subject 30 to be protected as protected area 46. Accordingly, as shown in FIG. 4I, protection is applied to entire shooting field 40 including the facial portion of subject 30 to be protected.

As shown in FIG. 6A, if subject 31 captured in shooting field 40 is image display unit 36 displaying image 35 to apply copyright protection, image 35 to be protected is specified as protected area 46, and protection is applied, as shown in FIG. 6B. FIGS. 6A to 6C are the cases that the type information does not conform to EPG information in the type determination described in Step S106 in FIG. 3. In this case, the user sets time to apply protection to subject 31 to be protected via user I/F 24. Protection time control unit 74 controls protected area control unit 72 based on the protection time information on protection application time set by the user via user I/F 24. Accordingly, after the protection application time set by the user passes, protection of image 35 is turned off, as shown in FIG. 6A.

When the user sets time for applying protection to subject 31 to be protected, using user I/F 24, the dynamic mask control and the static mask control can also be switched depending on time. In this case, during the time when the static mask control is set, protection based on the static mask control, such as computer-generated mosaic, is applied, as shown in FIG. 6B. During the time when the dynamic mask control is set, protection based on the dynamic mask control, typically a moving image, is applied, as shown in FIG. 6C. In other words, protection time control unit 74 controls protected area control unit 72 such that protected area control unit 72 applies protection to protected area 46 in subject 31 to be protected by switching between the dynamic mask control and the static mask control depending on time.

When subject 31 captured within shooting field 40 includes image 35, in which digital watermark is embedded, as shown in FIG. 6A, extraction unit 84 can also identify image display unit 36 or an area such as display portion, on which digital watermark is embedded, in the image. In this case, the position, size and shape of the area on the image determined by extraction unit 84 is notified to detection unit 83 as the watermark area information. Based on this watermark area information, detection unit 83 dynamically detects identified area 44, and notifies it to protected area control unit 72. Protected area control unit 72 then specifies protected area 46 from identified area 44 notified, and notifies this protected area 46 to protection processing unit 18. This enables protection processing unit 18 to apply protection to area where a digital watermark is detected on the image, as shown in FIG. 6B.

As described above, camera device 10 can apply protection to an image to be protected and obscure the image even if an image that requires copyright, portrait right or privacy protection is displayed on image display unit 36, such as a television set, and the user takes the image without being conscious of the image that requires protection. In addition, since protection is applied only to image display unit 36, where image 35 to be protected is displayed, an area that the user intended to photograph is not eaten away.

As shown in FIG. 7A, if subject 31 captured in shooting field 40 is image display unit 36 displaying image 35 to apply copyright protection and art work 37 to apply copyright protection, both image 35 to be protected and art work 37 to be protected are identified as protected areas 46, and protection is applied to these areas, as shown in FIG. 7B. In FIG. 7B, camera device 10 has monitor 28, which is presentation unit 23, and thus image data V31 after applying protection is visible on monitor 28.

FIG. 7C illustrates an image after protection is applied when camera device 10 is operated in line with a movement of the user capturing stationary subject 31. The movement of camera device 10 is detected by gyro unit 26, and the position information and the direction information of camera device 10 are notified from gyro unit 26 to detection unit 83 and protected area control unit 72. Protected area control unit 72 changes protected area 46 based on a movement of camera device 10. Protected area prediction control unit 75 may also predict the shape, size, direction and position of protected area 46 that relatively moves, based on the position information and the direction information on camera device 10 notified from gyro unit 26 to protected area control unit 72, so as to prepare a masking area. This prepared mask area is specified as protected area 46, and may also be notified to protection processing unit 18. This enables prediction of the movement of a protection target in shooting field 40. Accordingly, protected area 46 is dynamically specified, making feasible accurate protection of protected area 46.

FIG. 7D illustrates an image after protection is applied when camera device 10 moves in line with the movement of the user imaging stationary subject 31, same as in FIG. 7C. FIG. 7D shows an image in shooting field when the user moves to the back of image display unit 36. Since image display unit 36 is present between art work 37 and camera device 10, a part of art work 37 to be protected overlaps with image display unit 36. Image 35 to be protected displayed on image display unit 36 does not exist in shooting field 40 because the user has moved to the back of image display unit 36. When image 35 to be protected no longer exists in shooting field 40, as is in this example, protected area control unit 72 specifies protected area 46 such that no protected area 46 corresponding to image 35 exists within shooting field 40. In this way, when a direction of a target to be protected changes, and the target to be protected no longer exists within shooting field 40, protected area control unit 72 accurately specifies protected area 46 by taking into account the direction information, in particular, on the protection target included in the subject information. As a result, an area to apply protection does not exist in shooting field 40, and thus no unnecessary protection is applied. Furthermore, if a part of multiple subjects 31 in shooting field 40 exists in an overlapped state, protected area control unit 72 detects an overlapped portion of multiple subjects 31 based on the protection target positional information, in particular, included in the subject information. This enables a dynamic change of protected area 46 for protecting art work 37. As a result, only an area requiring protection in shooting field 40 is dynamically protected.

As shown in FIG. 8A, if subject 31 captured in shooting field 40 is image display unit 36 displaying image 35 to apply copyright protection and art work 37 to apply copyright protection, image 35 to be protected and art work 37 to be protected are identified as protected areas 46, and protection is applied, as shown in FIG. 8B. If the user zooms in camera device 10, the size of protection target in shooting field 40 changes, as shown in FIG. 8C. If a magnification rate of camera device 10 changes by zoom-in or zoom-out operation, camera control unit 15 notifies protected area control unit 72 of information on a change in magnification rate as the operation information. Protected area control unit 72 then changes protected area 46, based on the operation information notified, and notifies protection processing unit 18 of changed protected area information. Accordingly, protected area 46 is changed following the movement of protection target in shooting field 40, as shown in FIG. 8C, when camera device 10 executes the zoom-in operation. In the same way, when camera device 10 executes the zoom-out operation, protected area 46 is changed following the movement of the protection target in shooting field, as shown in FIG. 8D.

As shown in FIGS. 8A to 8D, image display unit 36 captured in shooting field 40 reproduces and displays a content to be protected. In addition, image display unit 36 holds the EPG information, and the EPG information on contents to be displayed on image display unit 36 is stored in IC tag 34 attached to image display unit 36. In other words, in the type determination described in Step S106 in FIG. 3, the type information included in the protection target information stored in IC tag 34 attached to image display unit 36 captured in shooting field 40 conforms to EPG information. In this case, protection time control unit 74 obtains the EPG information via communications unit 14, and controls protected area control unit 72 such that it identifies protected area 46 only during the time assumed to be a broadcast time of a specific program, based on the EPG information. Only during this time, protection is applied to a content to be protected, which is reproduced on image display unit 36, according to the EPG information obtained. Accordingly, protection processing unit 18 can apply protection only to a specific program to be protected. As a result, protection is applied to a protection target only when required.

As described above, the imaging method applied to camera device 10 of the present invention is the method of imaging and applying protection to subjects 30 and 31 that require copyright or privacy protection contained in a protection target. This imaging method of the present invention at least includes the imaging step, the communications step, the identified area detection step and the image data processing step. The imaging step is for imaging an area in shooting field 40 so as to obtain image data. The communications step is for communicating with IC tag 34 storing the subject information including the size, shape, direction and position of a specific subject, so as to obtain the subject information. The identified area detection step is for dynamically detecting identified area 44 corresponding to specific subjects 30 and 31 including image data sets V10 and V20 obtained in the imaging step. The image data processing step is for specifying protected area 46 from identified area 44 detected in the identified area detection step, based on the subject information obtained in the communications step if subjects 30 and 31 requires copyright or privacy protection. By executing the imaging step to the image data protection processing step, protected area 46 is dynamically specified for applying copyright, portrait right or privacy protection to subjects 30 and 31 of an image in shooting field 40 including subjects 30 and 31 where IC tag 34 is attached. In particular, for example, identified area 44 that becomes a protection target in a moving image is followed and protected so as to calculate for each image frame the position and size of protected area 46 and protect it. In addition, the size of a target to be protected in a moving image is accurately corrected based on the operation information of camera device 10 and the distance information between camera device 10 and subjects 30 and 31. Accordingly, even if subjects 30 and 31 to be protected move, camera device 10 is moved, or the size of subject in the image changes due to a change in magnification rate; protection is applicable to the subject, corresponding to a change in its size.

This exemplary embodiment refers to a structure of recording image data V31 including protected area 46, to which protection is applied, in recording medium 22. However, a structure to display image data sets V10, V20, and V30 that are not protected on presentation unit 23 is also applicable. In other words, image data recorded to recording medium 22 and image data read out from recording medium 22 and displayed on presentation unit 23 may be changed as required and supplied as image data V31 including protected area 46 after applying protection and image data V10, V20, and V30 to which protection is not applied.

Still more, this exemplary embodiment refers to a structure of detecting identified areas 44 corresponding to subjects 30 and 31 to apply copyright or privacy protection, and specifying protected area 46 from identified areas 44 so as to apply protection. However, if the user attaches IC tag 34 to subjects 30 and 31 to be deleted from the image in advance, a structure including an edit function to replace protected areas 46 corresponding to subjects 30 and 31 to be deleted with other images, respectively, is also applicable.

Figure 9:
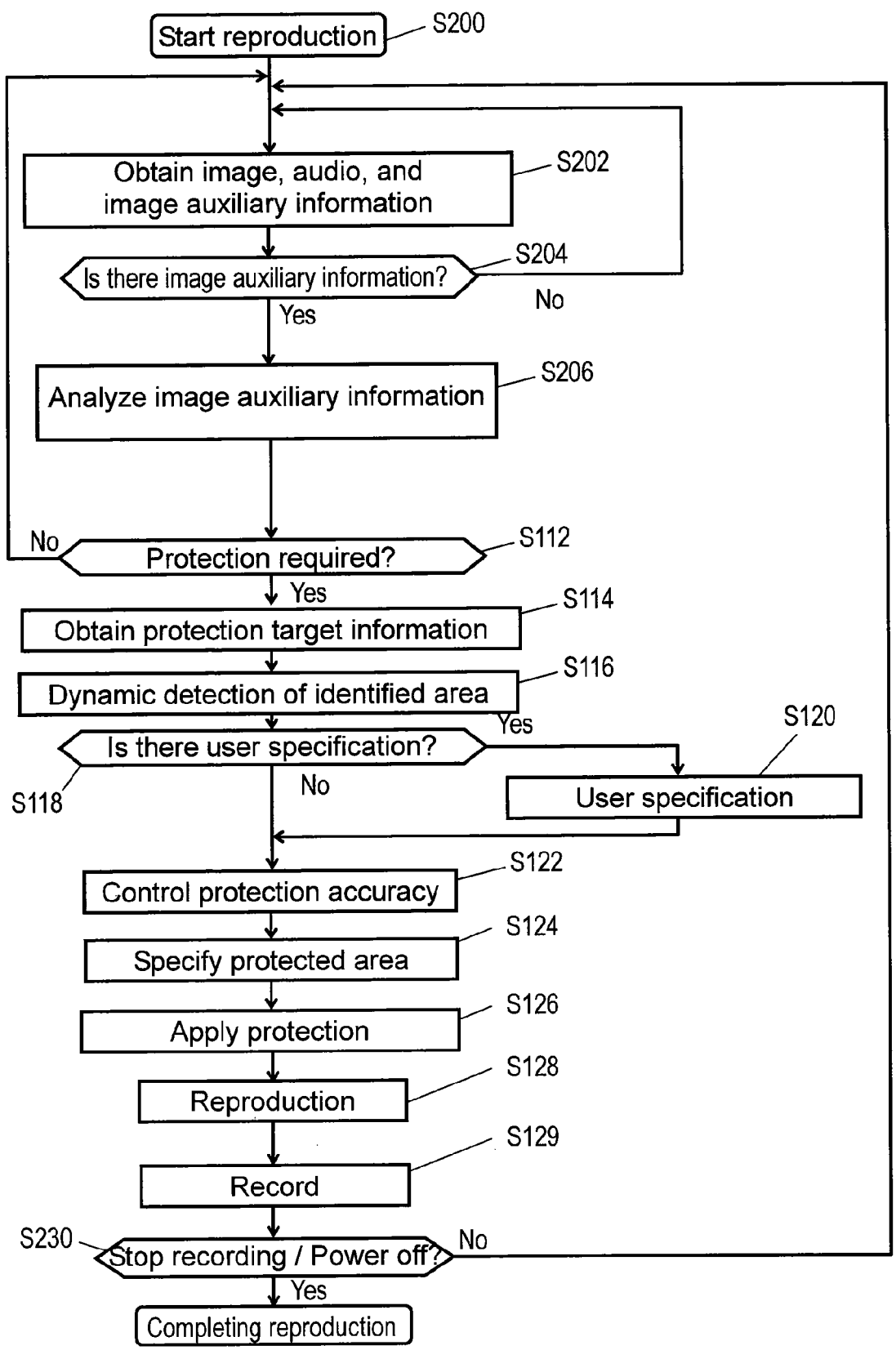
FIG. 9 is a flow chart illustrating a protected reproduction method applied to the camera device in FIG. 1.
Figure 10A:
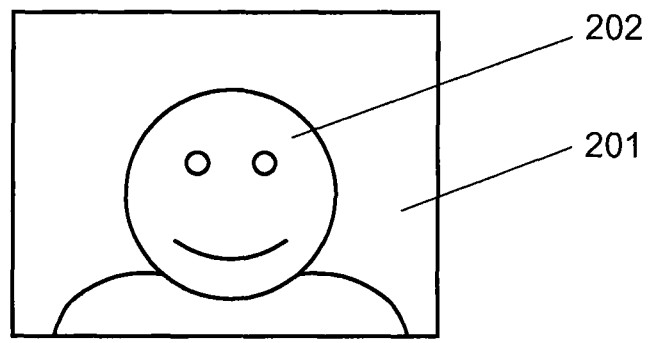
FIG. 10A is an example of image captured by a conventional camera.
Figure 10B:
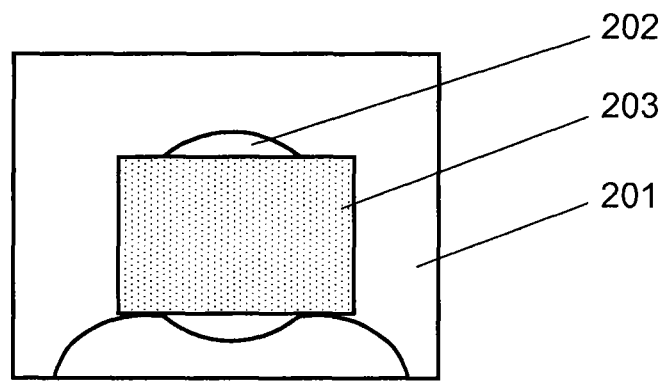
FIG. 10B is an example of image captured by the conventional camera.

Still more, as shown in FIG. 3, this exemplary embodiment refers to a structure of specifying protected area 46 so as to apply protection at the time of imaging subjects 30 and 31 including a protection target by using cameras 11 and 12 in camera device 10. However, the present invention is not limited to the operation of dynamically detecting identified area 44, specifying protected area 46 from identified areas 44, and applying protection to specified protected area 46 at the same time as capturing an image. For example, in case of imaging subjects 30 and 31 including a protection target, for example, captured image data sets V10, V20, and V30, and audio data A3 are recorded as image and audio information on recoding media 22 via processing unit 19. In recording the image and audio information, the subject information including the protection target information on subjects 30 and 31 to be captured is recorded on recording medium 22 as the image auxiliary information. At the same time, the imaging condition information including the operation information and the distance information related to imaging of an image by camera device 10 is recorded on recording medium 22 as the image auxiliary information. At the time of reproducing the image and audio information, identified area 44 may be dynamically detected, protected area 46 may be specified from identified area 44, and protection may be applied to specified protected area 46. FIG. 9 is a flow chart illustrating protected reproduction method for applying protection to an image to be protected at the time of reproducing this type of image data. In the flow chart showing the protected reproduction method in FIG. 9, the step names same as those in the flow chart for the imaging method shown in FIG. 3 are given, so as to omit duplicate detailed description. In each step of imaging method shown in FIG. 3, identified area 44 is detected and protected area 46 is specified to apply protection to image data sets V10, V20, and V30 captured by cameras 11 and 12. In the protected reproduction method shown in FIG. 9, identified area 44 is detected and protected area 46 is specified to apply protection to image data recorded in recording medium 22.

As shown in FIG. 9, when the user inputs the start of protected reproduction to camera device 10 via user I/F 24, an image designated by the user is selected, and camera device 10 starts reproduction (Step S200). In other words, a reproduction step starts. When the reproduction step starts, processing unit 19 obtains the image and audio information and the image auxiliary information attached to the image and audio information from recording medium 22 (Step S202). The image and audio information includes the image data and the audio data. If subjects 30 and 31 including a target to be protected are captured in an image to be reproduced, the subject information on a target to be protected is recorded in recording medium 22 as the image auxiliary information belonging to the image and audio information. Accordingly, if no image auxiliary information belonging to the image and audio information is recorded in recording medium 22, an image to be reproduced is determined to be not an image capturing a protection target. Therefore, processing unit 19 determines whether or not the image auxiliary information attached to the image and audio information obtained is recorded in recording medium 22 (Step S204). If no image auxiliary information is obtained (No), the operation returns to Step S202. If the image auxiliary information is obtained (Yes), the operation proceeds to Step S206.

The image auxiliary information obtained by processing unit 19 is notified to and analyzed in protection determination unit 71. Next, in the protection determination step, protection determination unit 71 analyzes the image auxiliary information obtained, and determines the presence of information on copyright or privacy protection in the image auxiliary information (Step S206). If protection determination unit 71 determines that protection is required (Yes) based on the presence of information on copyright or privacy protection, the operation proceeds to Step S114. If protection determination unit 71 determines that protection is not required (No), the operation proceeds to Step S202. In case of proceeding to Step S202, processing unit 19 obtains the image and audio information and the image auxiliary information again.

In the protection determination step, if protection determination unit 71 determines that protection is "required," as a result of analysis of the subject information included in the image auxiliary information, each step on and after the protection target information acquisition step is executed, same as that shown in FIG. 3. In the protected area control step, protected area control unit 72 identifies a protected area based on the subject information and the imaging condition information included in the image auxiliary information.

After each step on and after the protection target information acquisition step is executed, protection control unit 17 determines whether or not the instruction information for completing protective reproduction is notified from user I/F 24. If the instruction information for completing reproduction is notified (Yes), reproduction ends (Step S230). If no instruction information for completing reproduction is notified (No), the operation proceeds to Step S202 again, and the above steps are repeated.

As described above the protected reproduction method applied to camera device 10 of the present invention is a protected reproduction method of reproducing an imaging target after applying protection to subjects 30 and 31 to apply copyright or privacy protection. The protected reproduction method at least includes the reproduction step, the image auxiliary information acquisition step, the identified area detection step and the image data processing step. The reproduction step is to reproduce image data of an area captured within shooting field 40. The image auxiliary information acquisition step is to obtain the subject information including the size, shape, direction and position of a specific subject. This subject information is attached to image data. The identified area detection step is to dynamically detect identified area 44 corresponding to specific subjects 30 and 31 included in the image data obtained in the reproduction step. The image data processing step is to specify protected area 46 from identified area 44 detected in the identified area detection step, based on the subject information obtained in the image auxiliary information acquisition step, and to apply protection to protected area 46 if subjects 30 and 31 require copyright or privacy protection. By executing these steps from reproduction to image data protection, protected area 46 to apply copyright or privacy protection in an image in shooting field 40 including subjects 30 and 31 to be protected is dynamically specified and protected on reproducing the image. In particular, since the position and the size of protected area to be protected are calculated for each image frame, for example, so as to apply protection, identified area 44 to be protected in a moving image is followed and protected. In addition, the size of protected area is accurately corrected by using the operation information of camera device 10 and the distance information on a distance between camera device 10 and subjects 30 and 31. Accordingly, even if the size of subject in the image changes due to movement of subjects 30 and 31 to be protected or camera device 10 or a change in zooming rate, protection is applicable to the subject corresponding to any change in the size.

The present invention is described in accordance with the above exemplary embodiment. However, the present invention is not limited to the above exemplary embodiment. The present invention further includes the following structures.

A part of components configuring camera device 10 shown in FIG. 1 may be included in one piece of a system LSI (Large Scale Integration). The system LSI is typically an ultra-multifunctional LSI manufactured by integrating multiple components on one chip. If a part of components of camera device 10 is included in the system LSI, high-speed processing becomes feasible by configuring at least image and audio forming unit 16, protection control unit 17, protection processing unit 18 and detection unit 83 with the system LSI. In addition, processing unit 13, communications unit 14, camera control unit 15 and memory 81 may also be integrated in the system LSI. Still more, processing unit 19, R/W control unit 20 and output I/F 21 may also be integrated. Furthermore, distance estimation unit 82, extraction unit 84 and shape searching unit 85 may also be integrated.

With respect to circuits realizing camera device 10 of the present invention, each of components configuring circuits may take the form of a chip separately. Alternatively, a part or all components may be included in one chip. A one-chip structure enables the same structure as the system LSI.

The present invention is not limited to the system LSI. The present invention may also adopt a structure called IC, LSI, super LSI or ultra LSI, depending on a degree of integration. In addition, circuit integration is not limited to LSI. A dedicated circuit or general-purpose processing unit is also applicable. In addition, PFGA (Field Programmable Gate Array) that allows programming after manufacturing LSI or a reconfigurable processing unit that allows reconfiguration of connection and setting of circuit cells inside LSI is also applicable.

Still more, if another integrated circuit technology replacing LSI is introduced in line with advancement in semiconductor technology or other technology derived from advancement, it is apparent that functional blocks may be integrated using new technology. Application of biotechnology is future possibility.

The imaging method of the present invention may also be a computer program operated typically by a computer. Still more, the imaging method may also be digital signals of computer program.

Still more the present invention may have a structure that a computer program or digital signal is recorded on readable recording medium such as flexible disk, hard disk, CD-ROM, MO, DVD, DVD-ROM, DVD-RAM, BD and semiconductor memory. Digital signals recorded in these recording media are also applicable.

Still more, the present invention may have a structure that a computer program or digital signal is transmitted via telecommunication line, wireless network, wire communication line and other networks typically Internet, or data broadcast.

Still more, the present invention may be a computer system including a microprocessor and memory. The memory stores the computer program, and the microprocessor operates according to the computer program.

Still more, the present invention may have a structure that another independent computer system executes the operation by transmitting a computer program or digital signal recorded on a recording medium, or transmitting a computer program or digital signal via a network.

Furthermore, the present invention may have a structure in which the exemplary embodiment and other variations are combined.

Industrial Applicability

The camera device of the present invention follows and identifies a subject requiring copyright, portrait right or other privacy protections, and applies protection to the image area of the subject even if the subject moves or changes. Accordingly, the present invention is applicable to a digital camera that photographs and captures video data or still-image data, and to an imaging method adopted in monitor cameras and other electronic devices.

The invention claimed is:

1. A camera device comprising:
a plurality of imaging units for imaging an area in a shooting field so as to obtain an image data;
a communications unit for communicating with a specific subject and receiving object information including a size, shape, direction and position of the specific subject as subject information;
a distance estimation unit for estimating distance information of the specific subject with respect to the camera device by estimating a sideway deviation of the specific subject using at least two of the plurality of imaging units;
an identified area detection unit for dynamically detecting an identified area corresponding to the subject included in the image data obtained by the imaging unit according to at least the distance information; and
an image data processing unit for specifying a protected area in the identified area detected by the identified area detection unit based on protection target information included in the subject information received by the communications unit, and applying protection only to the protected area when the subject includes a protection target to be protected, the subject information includes both of the object information and the protection target information including protection target size, protection target shape, protection target direction and protection target position related to the protection target.

2. The camera device of claim 1, further comprising:
a user designation unit for designating the protected area by user;
wherein the image data processing unit specifies a user-specific protected area in the identified area based on the protection target information included in the subject information, and applies protection.

3. The camera device of claim 1,
wherein the image data processing unit includes a protection accuracy control unit for controlling accuracy of protection applied to the protected area.

4. The camera device of claim 3,
wherein the protection accuracy control unit controls protection depending on a direction of the subject, the protection being applied to a projective area relative to a photographed face of an area requiring protection in the subject.

5. The camera device of claim 3,
wherein the protection accuracy control unit controls protection by adjusting a margin area around the subject to be protected to a predetermined range and shape in accordance with at least one of user setting and use environment.

6. The camera device of claim 1,
wherein the image data processing unit includes a protection time control unit for controlling time to apply protection to the protected area.

7. The camera device of claim 6,
wherein the protection time control unit applies protection to the protected area in accordance with user setting.

8. The camera device of claim 6,
wherein the protection time control unit switches protection applied to the protected area between a dynamic mask control and a static mask control, depending on time, in accordance with user setting.

9. A camera device comprising:
an imaging unit for imaging an area in a shooting field so as to obtain an image data;
a communications unit for communicating with a specific subject and receiving object information including a size, shape, direction and position of the specific subject as subject information;
an identified area detection unit for dynamically detecting an identified area corresponding to the subject included in the image data obtained by the imaging unit; and
an image data processing unit for specifying a protected area in the identified area detected by the identified area detection unit based on protection target information included in the subject information received by the communications unit, and applying protection only to the protected area when the subject includes a protection target to be protected, the subject information includes both of the object information and the protection target information including protection target size, protection target shape, protection target direction and protection target position related to the protection target;
wherein the image data processing unit includes a protection time control unit for controlling time to apply protection to the protected area; and
wherein the subject includes an image display unit reproducing and displaying a content to be protected,
the image display unit holds EPG information,
the communications unit obtains the EPG information, and
the protection time control unit limits the time to apply protection to the protected area to time corresponding to broadcast time of a specific program in accordance with the EPG information obtained.

10. The camera device of claim 1,
wherein the image data processing unit includes a protected area control unit for controlling the protected area.

11. The camera device of claim 10,
wherein the protected area control unit changes the protected area following one of movement of the subject and operation of the camera device.

12. The camera device of claim 10,
wherein the protected area control unit changes the protected area following one of zoom-in and zoom-out operations.

13. The camera device of claim 1, further comprising:
a recording unit for recording the subject information on the subject to which one of copyright and privacy protections is applied as image auxiliary information that is separate from the image information.

14. The camera device of claim 1,
wherein the image data processing unit detects an overlapped portion of multiple subjects based on the subject information obtained by the communications unit and dynamically changes the protected area when portions of the multiple subjects are overlapped.

15. The camera device of claim 1,
wherein the image data processing unit dynamically replaces the protected area of the subject with a different image.

16. The camera device of claim 1,
wherein the image data processing unit includes a protected area prediction unit for predicting the protected area and preparing a masking area in advance, the protected area being predicted based on at least one of a movement of the subject and information on a frame before or after a recorded or reproduced image, and the image data processing unit applying protection to the masking area prepared.

17. The camera device of claim 1, further comprising:
a gyro sensor,
wherein the image data processing unit includes a protected area prediction unit for predicting the protected area and preparing a masking area in advance, the protected area being predicted based on output information of the gyro sensor, and the image data processing unit applying protection to the masking area prepared.

18. An imaging method of applying protection to a subject to be protected in an imaging target in an imaging operation, the method comprising:
an imaging step of obtaining an image data by imaging an area in a shooting field;
a communications step of communicating with the subject and receiving object information including a size, shape, direction and position of the subject, the subject information being provided with the subject as subject information;
a distance estimating step of estimating sideway deviation of the subject for estimating distance information;
an identified area detection step of dynamically detecting an identified area corresponding to a specific subject included in the image data obtained; and
an image data processing step of specifying a protected area in the identified area detected based on protection target information included in the subject information received, and applying protection only to the protected area when the subject includes a protection target to be protected, the subject information includes both of the object information and the protection target information including protection target size, protection target shape, protection target direction and protection target position related to the protection target.

19. The camera device of claim 2,
wherein the image data processing unit includes a protection accuracy control unit for controlling accuracy of protection applied to the protected area.

20. The camera device of claim 2,
wherein the image data processing unit includes a protection time control unit for controlling time to apply protection to the protected area.

21. The camera device of claim 2,
wherein the image data processing unit includes a protected area control unit for controlling the protected area.

22. The camera device of claim 2, further comprising:
a recording unit for recording the subject information on the subject to which one of copyright and privacy protections is applied as image auxiliary information that is separate from the image information.

23. The camera device of claim 2,
wherein the image data processing unit detects an overlapped portion of multiple subjects based on the subject information obtained by the communications unit and dynamically changes the protected area when portions of the multiple subjects are overlapped.

24. The camera device of claim 2,
wherein the image data processing unit dynamically replaces the protected area of the subject with a different image.

25. The camera device of claim 2,
wherein the image data processing unit includes a protected area prediction unit for predicting the protected area and preparing a masking area in advance, the protected area being predicted based on at least one of a movement of the subject and information on a frame before or after a recorded or reproduced image, and the image data processing unit applying protection to the masking area prepared.

26. The camera device of claim 2, further comprising:
a gyro sensor,
wherein the image data processing unit includes a protected area prediction unit for predicting the protected area and preparing a masking area in advance, the protected area being predicted based on output information of the gyro sensor, and the image data processing unit applying protection to the masking area prepared.

27. A camera device comprising:
a plurality of imaging units for imaging an area in a shooting field so as to obtain an image data;
a communications unit for communicating with a specific subject and receiving object information including an object size, object shape, object direction and object position, relating to the specific subject; and protection target information including a protection target size, a protection target shape, a protection target direction and a protection target position, related to a protection target,
a distance estimation unit for estimating distance information of the specific subject with respect to the camera device by estimating a sideway deviation of the specific subject using at least two of the plurality of imaging units;
an identified area detection unit for dynamically detecting an identified area corresponding to the subject included in the image data obtained by the imaging unit according to at least the distance information; and
an image data processing unit for specifying a protected area in the identified area based on the protection target information received by the communications unit, and applying protection only to the protected area when the subject includes a protection target to be protected and the subject information includes both the object information and the protection target information.

28. An imaging method of applying protection to a subject to be protected in an imaging target in an imaging operation, the method comprising:
an imaging step of obtaining an image data by imaging an area in a shooting field;
a communications step of communicating with the subject and receiving at least object information including an object size, object shape, object direction and object position, relating to the subject, the object information being provided with the subject as subject information;
a distance estimating step of estimating sideway deviation of the subject for estimating distance information;

an identified area detection step of dynamically detecting an identified area corresponding to a specific subject included in the image data obtained; and an image data processing step of specifying a protected area in the identified area detected based on protection target information including a protection target size, a protection target shape, a protection target direction and a protection target position, related to a protection target, and applying protection only to the protected area when the subject includes the protection target to be protected and the subject information includes both of the object information and the protection target information.

29. The camera device of claim 1,
wherein the distance estimation unit estimates a first distance of the specific subject with respect to the camera device according to a first estimated sideway deviation being larger than a second estimated sideway deviation for a second distance, wherein the first distance is shorter than the second distance.

30. The camera device of claim 1,
wherein the distance estimation unit estimates the sideway deviation according to a portion of the image data captured by the at least two of the plurality of imaging units.

* * * * *